(12) United States Patent
Zhang et al.

(10) Patent No.: US 9,048,909 B2
(45) Date of Patent: Jun. 2, 2015

(54) METHOD FOR TRANSMITTING CHANNEL STATE INFORMATION AND DEVICE THEREOF

(75) Inventors: Ranran Zhang, Beijing (CN); Qiubin Gao, Beijing (CN); Meifang Jing, Beijing (CN); Rakesh Tamrakar, Beijing (CN); Guojun Xiao, Beijing (CN)

(73) Assignee: DATANG MOBILE COMMUNICATIONS EQUIPMENT CO., LTD., Beijing (CN)

( * ) Notice: Subject to any disclaimer, the term of this patent is extended or adjusted under 35 U.S.C. 154(b) by 0 days.

(21) Appl. No.: 14/002,108

(22) PCT Filed: Nov. 8, 2011

(86) PCT No.: PCT/CN2011/081927
§ 371 (c)(1),
(2), (4) Date: Aug. 28, 2013

(87) PCT Pub. No.: WO2012/062199
PCT Pub. Date: May 18, 2012

(65) Prior Publication Data
US 2014/0050276 A1    Feb. 20, 2014

(30) Foreign Application Priority Data
Nov. 8, 2010    (CN) .......................... 2010 1 0539050

(51) Int. Cl.
*H04B 7/00* (2006.01)
*H04B 7/06* (2006.01)
*H04B 7/04* (2006.01)
(Continued)

(52) U.S. Cl.
CPC ............. *H04B 7/0626* (2013.01); *H04B 7/063* (2013.01); *H04B 7/0639* (2013.01);
(Continued)

(58) Field of Classification Search
CPC .. H04B 7/0626; H04B 7/0632; H04B 7/0634; H04B 7/0639
USPC .................. 375/284, 285, 296, 346, 299, 267
See application file for complete search history.

(56) References Cited

U.S. PATENT DOCUMENTS 7,817,739 B2 * 10/2010 Wennstrom et al. .......... 375/260
8,249,047 B2 * 8/2012 Chun et al. .................... 370/343
(Continued)

FOREIGN PATENT DOCUMENTS

| CN | 101807981 A | 8/2010 |
| CN | 101867461 A | 10/2010 |
| CN | 102082639 A | 6/2011 |

OTHER PUBLICATIONS

International Search Report of PCT/CN2011/081927, mailed Feb. 16, 2012.

*Primary Examiner* — Kevin Kim
(74) *Attorney, Agent, or Firm* — Collard & Roe, P.C.

(57) ABSTRACT

Disclosed in an embodiment of the present invention is a method for transmitting channel state information and device thereof. By applying the technical schemes of the embodiment of the present invention, in a LTE-A system using PUCCH reporting mode 1-1, in a situation where PMI feedback for 8 antenna ports is needed to be reported in a subframe and PUCCH capacity is limited, therefore codebook compression is required, a corresponding relationship definition of the pre-coding matrix indicator information or the pre-coding matrix indicator information pair and the codebook index or the codebook index pair after codebook compression is provided, thus realizing the feedback and receiving of channel state information between a base station and terminal equipment.

16 Claims, 3 Drawing Sheets

(51) Int. Cl.
*H04L 25/03* (2006.01)
*H04L 1/00* (2006.01)

(52) U.S. Cl.
CPC ............ *H04L 1/0026* (2013.01); *H04L 1/0031* (2013.01); *H04B 7/0456* (2013.01); *H04B 7/0619* (2013.01); *H04L 25/0391* (2013.01)

(56) References Cited

U.S. PATENT DOCUMENTS

2010/0271970 A1* 10/2010 Pan et al. ..................... 370/252
2014/0050276 A1    2/2014  Zhang et al.

* cited by examiner

METHOD FOR TRANSMITTING CHANNEL STATE INFORMATION AND DEVICE THEREOF

CROSS REFERENCE TO RELATED APPLICATIONS

This application is the National Stage of PCT/CN2011/081927 filed on 8 Nov. 2011 which claims priority under 35 U.S.C. §119 of Chinese Application No. CN 201010539050.9 filed on 8 Nov. 2010, the disclosure of which is incorporated by reference. The international application under PCT article 21(2) was not published in English.

FIELD OF THE PRESENT INVENTION

The present invention relates to the field of communication technology, in particular to the method for transmitting channel state information and device thereof.

BACKGROUND OF THE PRESENT INVENTION

In a Multiple-Input Multiple-Output (MIMO) system, if a transmitter is able to be somehow informed of the channel information, the optimization on the transmitted signal can be available according to channel characteristics so as to improve the quality of receiving and reduce complexity requirements on the receiver. The feedback for channel information is usually achieved by the way of quantifying channel information in actual systems, so as to reduce feedback overhead, thus improving transmission efficiency of the system.

In Long Term Evolved (LTE) system, a codebook-based implicit Channel State Information (CSI) feedback method is adopted. User Equipment (UE, namely, terminal equipment) measures the downlink channels based on pilots and reports Rank Indication (RI) that downlink can support and Precoding Matrix Indicator (PMI) to a base station according to its own receiving processing algorithm. Meanwhile, UE further needs to report Channel Quality Indicator (CQI) of each codeword. Therein, during the calculation of CQI, UE assumes that the base station uses its recommended RI/PMI.

In LTE system, PMI is defined as follows:

For 2 antenna ports $\{0, 1\}$ and corresponding RI value which is 1, the PMI value $n \in \{0, 1, 2, 3\}$ shall correspond to the codebook index n in $\upsilon=1$ in the Table 1 below (a corresponding relationship of pre-coding matrix indicator information in LTE system with the codebook index in the codebook for 2 antenna ports);

For 2 antenna ports $\{0, 1\}$ and corresponding RI value which is 2, the PMI value $n \in \{0, 1\}$ shall correspond to the codebook index n+1 in $\upsilon=2$ in Table 1 below;

For 4 antenna ports $\{0, 1, 2, 3\}$ and corresponding RI value which is 2, the PMI value $n \in \{0, 1, \ldots, 15\}$ shall correspond to the codebook index n in $\upsilon=$RI value in the below Table 2 (a corresponding relationship of pre-coding matrix indicator information in LTE system with the codebook index in the codebook for 4 antenna ports).

TABLE 1

| Codebook index | Rank 1 | Rank 2 |
|---|---|---|
| 0 | $\frac{1}{\sqrt{2}}\begin{bmatrix}1\\1\end{bmatrix}$ | $\frac{1}{\sqrt{2}}\begin{bmatrix}1 & 0\\0 & 1\end{bmatrix}$ |
| 1 | $\frac{1}{\sqrt{2}}\begin{bmatrix}1\\-1\end{bmatrix}$ | $\frac{1}{2}\begin{bmatrix}1 & 1\\1 & -1\end{bmatrix}$ |
| 2 | $\frac{1}{\sqrt{2}}\begin{bmatrix}1\\j\end{bmatrix}$ | $\frac{1}{2}\begin{bmatrix}1 & 1\\j & -j\end{bmatrix}$ |
| 3 | $\frac{1}{\sqrt{2}}\begin{bmatrix}1\\-j\end{bmatrix}$ | — |

TABLE 2

| Codebook index | $u_n$ | Rank $\upsilon$ = 1 | Rank $\upsilon$ = 2 | Rank $\upsilon$ = 3 | Rank $\upsilon$ = 4 |
|---|---|---|---|---|---|
| 0 | $u_0 = [1\ -1\ -1\ -1]^T$ | $W_0^{\{1\}}$ | $W_0^{\{14\}}/\sqrt{2}$ | $W_0^{\{124\}}/\sqrt{3}$ | $W_0^{\{1234\}}/2$ |
| 1 | $u_1 = [1\ -j\ 1\ j]^T$ | $W_1^{\{1\}}$ | $W_1^{\{12\}}/\sqrt{2}$ | $W_1^{\{123\}}/\sqrt{3}$ | $W_1^{\{1234\}}/2$ |
| 2 | $u_2 = [1\ 1\ -1\ 1]^T$ | $W_2^{\{1\}}$ | $W_2^{\{12\}}/\sqrt{2}$ | $W_2^{\{123\}}/\sqrt{3}$ | $W_2^{\{3214\}}/2$ |
| 3 | $u_3 = [1\ j\ 1\ -j]^T$ | $W_3^{\{1\}}$ | $W_3^{\{12\}}/\sqrt{2}$ | $W_3^{\{123\}}/\sqrt{3}$ | $W_3^{\{3214\}}/2$ |
| 4 | $u_4 = [1\ (-1-j)/\sqrt{2}\ -j\ (1-j)/\sqrt{2}]^T$ | $W_4^{\{1\}}$ | $W_4^{\{14\}}/\sqrt{2}$ | $W_4^{\{124\}}/\sqrt{3}$ | $W_4^{\{1234\}}/2$ |
| 5 | $u_5 = [1\ (1-j)/\sqrt{2}\ j\ (-1-j)/\sqrt{2}]^T$ | $W_5^{\{1\}}$ | $W_5^{\{14\}}/\sqrt{2}$ | $W_5^{\{124\}}/\sqrt{3}$ | $W_5^{\{1234\}}/2$ |
| 6 | $u_6 = [1\ (1+j)/\sqrt{2}\ -j\ (-1+j)/\sqrt{2}]^T$ | $W_6^{\{1\}}$ | $W_6^{\{13\}}/\sqrt{2}$ | $W_6^{\{134\}}/\sqrt{3}$ | $W_6^{\{1324\}}/2$ |
| 7 | $u_7 = [1\ (-1+j)/\sqrt{2}\ j\ (1+j)/\sqrt{2}]^T$ | $W_7^{\{1\}}$ | $W_7^{\{13\}}/\sqrt{2}$ | $W_7^{\{134\}}/\sqrt{3}$ | $W_7^{\{1324\}}/2$ |
| 8 | $u_8 = [1\ -1\ 1\ 1]^T$ | $W_8^{\{1\}}$ | $W_8^{\{12\}}/\sqrt{2}$ | $W_8^{\{124\}}/\sqrt{3}$ | $W_8^{\{1234\}}/2$ |
| 9 | $u_9 = [1\ -j\ -1\ -j]^T$ | $W_9^{\{1\}}$ | $W_9^{\{14\}}/\sqrt{2}$ | $W_9^{\{134\}}/\sqrt{3}$ | $W_9^{\{1234\}}/2$ |
| 10 | $u_{10} = [1\ 1\ 1\ -1]^T$ | $W_{10}^{\{1\}}$ | $W_{10}^{\{13\}}/\sqrt{2}$ | $W_{10}^{\{123\}}/\sqrt{3}$ | $W_{10}^{\{1324\}}/2$ |
| 11 | $u_{11} = [1\ j\ -1\ j]^T$ | $W_{11}^{\{1\}}$ | $W_{11}^{\{13\}}/\sqrt{2}$ | $W_{11}^{\{134\}}/\sqrt{3}$ | $W_{11}^{\{1324\}}/2$ |
| 12 | $u_{12} = [1\ -1\ -1\ 1]^T$ | $W_{12}^{\{1\}}$ | $W_{12}^{\{12\}}/\sqrt{2}$ | $W_{12}^{\{123\}}/\sqrt{3}$ | $W_{12}^{\{1234\}}/2$ |
| 13 | $u_{13} = [1\ -1\ 1\ -1]^T$ | $W_{13}^{\{1\}}$ | $W_{13}^{\{13\}}/\sqrt{2}$ | $W_{13}^{\{123\}}/\sqrt{3}$ | $W_{13}^{\{1324\}}/2$ |
| 14 | $u_{14} = [1\ 1\ -1\ -1]^T$ | $W_{14}^{\{1\}}$ | $W_{14}^{\{13\}}/\sqrt{2}$ | $W_{14}^{\{123\}}/\sqrt{3}$ | $W_{14}^{\{3214\}}/2$ |
| 15 | $u_{15} = [1\ 1\ 1\ 1]^T$ | $W_{15}^{\{1\}}$ | $W_{15}^{\{12\}}/\sqrt{2}$ | $W_{15}^{\{123\}}/\sqrt{3}$ | $W_{15}^{\{1234\}}/2$ |

Wherein, $W_n = I - 2u_n u_n^H / u_n^H u_n$, I refers to unit matrix of dimension 4×4, $u_n^H$ represents the conjugate transpose of $u_n$.

In Long Time Evolved Advanced (LTE-A) system, the codebook-based implicit CSI feedback method is further adopted. In order to improve the accuracy of PMI feedback, in LTE-A, a pre-coding matrix (W) is formed by merging two matrixes (W1 and W2); W1 and W2 are indicated by two PMIs respectively (the first PMI value, corresponding to W1; and the second PMI value, corresponding to W2).

The codebook in LTE version R8/9 is still used in 2 antenna ports and 4 antenna ports; W1 is defined as a unit matrix, while the first PMI value contains 0 bit of information, no feedback is required. Specifically, the corresponding relationship of pre-coding matrix indicator information in LTE-A system with the codebook index in the codebook for 8 antenna ports is shown is in Table 3 to Table 10.

Table 3 refers to codebook for 1-layer CSI reporting using antenna ports 15 to 22 (the codebook for 1-layer CSI reporting using 8 antenna ports (ports 15 to 22)), namely, Rank 1 codebook for 8 antenna ports in LTE-A system.

TABLE 3

| $i_1$ | \multicolumn{5}{c}{$i_2$} |
|---|---|---|---|---|---|
|  | 0 | 1 | 2 | 3 | 4 |
| 0-15 | $W^{(1)}_{2i_1,0}$ | $W^{(1)}_{2i_1,1}$ | $W^{(1)}_{2i_1,2}$ | $W^{(1)}_{2i_1,3}$ | $W^{(1)}_{2i_1+1,0}$ |

| $i_1$ | \multicolumn{5}{c}{$i_2$} |
|---|---|---|---|---|---|
|  | 5 | 6 | 7 | 8 | 9 |
| 0-15 | $W^{(1)}_{2i_1+1,1}$ | $W^{(1)}_{2i_1+1,2}$ | $W^{(1)}_{2i_1+1,3}$ | $W^{(1)}_{2i_1+2,0}$ | $W^{(1)}_{2i_1+2,1}$ |

| $i_1$ | \multicolumn{5}{c}{$i_2$} |
|---|---|---|---|---|---|
|  | 10 | 11 | 12 | 13 | 14 |
| 0-15 | $W^{(1)}_{2i_1+2,2}$ | $W^{(1)}_{2i_1+2,3}$ | $W^{(1)}_{2i_1+3,0}$ | $W^{(1)}_{2i_1+3,1}$ | $W^{(1)}_{2i_1+3,2}$ |

| $i_1$ | $i_2$ |
|---|---|
|  | 15 |
| 0-15 | $W^{(1)}_{2i_1+3,3}$ |

Therein $W^{(1)}_{m,n} = \frac{1}{\sqrt{8}}\begin{bmatrix} v_m \\ \varphi_n v_m \end{bmatrix}$ Table 4 refers to Codebook for 2-layer CSI reporting using antenna ports 15 to 22 (the codebook for 2-layer CSI reporting using 8 antenna ports (ports 15 to 22)), namely, Rank 2 codebook for 8 antenna ports in LTE-A system.

TABLE 4

| $i_1$ | \multicolumn{4}{c}{$i_2$} |
|---|---|---|---|---|
|  | 0 | 1 | 2 | 3 |
| 0-15 | $W^{(2)}_{2i_1,2i_1,0}$ | $W^{(2)}_{2i_1,2i_1,1}$ | $W^{(2)}_{2i_1+1,2i_1+1,0}$ | $W^{(2)}_{2i_1+1,2i_1+1,1}$ |

| $i_1$ | \multicolumn{4}{c}{$i_2$} |
|---|---|---|---|---|
|  | 4 | 5 | 6 | 7 |
| 0-15 | $W^{(2)}_{2i_1+2,2i_1+2,0}$ | $W^{(2)}_{2i_1+2,2i_1+2,1}$ | $W^{(2)}_{2i_1+3,2i_1+3,0}$ | $W^{(2)}_{2i_1+3,2i_1+3,1}$ |

| $i_1$ | \multicolumn{4}{c}{$i_2$} |
|---|---|---|---|---|
|  | 8 | 9 | 10 | 11 |
| 0-15 | $W^{(2)}_{2i_1,2i_1+1,0}$ | $W^{(2)}_{2i_1,2i_1+1,1}$ | $W^{(2)}_{2i_1+1,2i_1+2,0}$ | $W^{(2)}_{2i_1+1,2i_1+2,1}$ |

TABLE 4-continued

| $i_1$ | \multicolumn{4}{c}{$i_2$} |
|---|---|---|---|---|
|  | 12 | 13 | 14 | 15 |
| 0-15 | $W^{(2)}_{2i_1,2i_1+3,0}$ | $W^{(2)}_{2i_1,2i_1+3,1}$ | $W^{(2)}_{2i_1+1,2i_1+3,0}$ | $W^{(2)}_{2i_1+1,2i_1+3,1}$ |

Therein $W^{(2)}_{m,m',n} = \frac{1}{4}\begin{bmatrix} v_m & v_{m'} \\ \varphi_n v_m & -\varphi_n v_{m'} \end{bmatrix}$ Table 5 refers to Codebook for 3-layer CSI reporting using antenna ports 15 to 22 (the codebook for 3-layer CSI reporting using 8 antenna ports (ports 15 to 22)), namely, Rank 3 codebook for 8 antenna ports in LTE-A system.

TABLE 5

| $i_1$ | \multicolumn{3}{c}{$i_2$} |
|---|---|---|---|
|  | 0 | 1 | 2 |
| 0-3 | $W^{(3)}_{8i_1,8i_1,8i_1+8}$ | $W^{(3)}_{8i_1+8,8i_1,8i_1+8}$ | $\tilde{W}^{(3)}_{8i_1,8i_1+8,8i_1+8}$ |

| $i_1$ | \multicolumn{3}{c}{$i_2$} |
|---|---|---|---|
|  | 3 | 4 | 5 |
| 0-3 | $\tilde{W}^{(3)}_{8i_1+8,8i_1,8i_1}$ | $W^{(3)}_{8i_1+2,8i_1+2,4i_1+10}$ | $W^{(3)}_{8i_1+10,8i_1+2,8i_1+10}$ |

| $i_1$ | \multicolumn{3}{c}{$i_2$} |
|---|---|---|---|
|  | 6 | 7 | 8 |
| 0-3 | $\tilde{W}^{(3)}_{8i_1+2,8i_1+10,8i_1+10}$ | $\tilde{W}^{(3)}_{8i_1+10,8i_1+2,8i_1+2}$ | $W^{(3)}_{8i_1+4,8i_1+4,8i_1+12}$ |

| $i_1$ | \multicolumn{3}{c}{$i_2$} |
|---|---|---|---|
|  | 9 | 10 | 11 |
| 0-3 | $W^{(3)}_{8i_1+12,8i_1+4,8i_1+12}$ | $\tilde{W}^{(3)}_{8i_1+4,8i_1+12,8i_1+12}$ | $\tilde{W}^{(3)}_{8i_1+12,8i_1+4,8i_1+4}$ |

| $i_1$ | \multicolumn{3}{c}{$i_2$} |
|---|---|---|---|
|  | 12 | 13 | 14 |
| 0-3 | $W^{(3)}_{8i_1+6,8i_1+6,8i_1+14}$ | $W^{(3)}_{8i_1+14,8i_1+6,8i_1+14}$ | $\tilde{W}^{(3)}_{8i_1+6,8i_1+14,8i_1+14}$ |

| $i_1$ | $i_2$ |
|---|---|
|  | 15 |
| 0-3 | $\tilde{W}^{(3)}_{8i_1+14,8i_1+6,8i_1+6}$ |

Therein $W^{(3)}_{m,m',m''} = \frac{1}{\sqrt{24}}\begin{bmatrix} v_m & v_{m'} & v_{m''} \\ v_m & -v_{m'} & -v_{m''} \end{bmatrix}$, $\tilde{W}^{(3)}_{m,m',m''} = \frac{1}{\sqrt{24}}\begin{bmatrix} v_m & v_{m'} & v_{m''} \\ v_m & v_{m'} & -v_{m''} \end{bmatrix}$ Table 6 refers to Codebook for 4-layer CSI reporting using antenna ports 15 to 22 (the codebook for 4-layer CSI reporting using 8 antenna ports (ports 15 to 22)), namely, Rank 4 codebook for 8 antenna ports in LTE-A system.

TABLE 6

| $i_1$ | $i_2$ | | |
|---|---|---|---|
| | 0 | 1 | 2 |
| 0-3 | $W^{(4)}_{8i_1,8i_1+8,0}$ | $W^{(4)}_{8i_1,8i_1+8,1}$ | $W^{(4)}_{8i_1+2,8i_1+10,0}$ |
| $i_1$ | 3 | 4 | 5 |
| 0-3 | $W^{(4)}_{8i_1+2,8i_1+10,1}$ | $W^{(4)}_{8i_1+4,8i_1+12,0}$ | $W^{(4)}_{8i_1+4,8i_1+12,1}$ |
| $i_1$ | 6 | 7 | |
| 0-3 | $W^{(4)}_{8i_1+6,8i_1+14,0}$ | $W^{(4)}_{8i_1+6,8i_1+14,1}$ | |

Therein $W^{(4)}_{m,m',n} = \frac{1}{\sqrt{32}} \begin{bmatrix} v_m & v_{m'} & v_m & v_{m'} \\ \varphi_n v_m & \varphi_n v_{m'} & -\varphi_n v_m & -\varphi_n v_{m'} \end{bmatrix}$ Table 7 refers to Codebook for 1-layer CSI reporting using antenna ports 15 to 22 (the codebook for 5-layer CSI reporting using 8 antenna ports (ports 15 to 22)), namely, Rank 5 codebook for 8 antenna ports in LTE-A system.

TABLE 7

| $i_1$ | $i_2$ |
|---|---|
| | 0 |
| 0-3 | $W^{(5)}_{i_1} = \frac{1}{\sqrt{40}} \begin{bmatrix} v_{2i_1} & v_{2i_1} & v_{2i_1+8} & v_{2i_1+8} & v_{2i_1+16} \\ v_{2i_1} & -v_{2i_1} & v_{2i_1+8} & -v_{2i_1+8} & v_{2i_1+16} \end{bmatrix}$ |

Table 8 refers to Codebook for 1-layer CSI reporting using antenna ports 15 to 22 (the codebook for 6-layer CSI reporting using 8 antenna ports (ports 15 to 22)), namely, Rank 6 codebook for 8 antenna ports in LTE-A system.

TABLE 8

| $i_1$ | $i_2$ |
|---|---|
| | 0 |
| 0-3 | $W^{(6)}_{i_1} = \frac{1}{\sqrt{48}} \begin{bmatrix} v_{2i_1} & v_{2i_1} & v_{2i_1+8} & v_{2i_1+8} & v_{2i_1+16} & v_{2i_1+16} \\ v_{2i_1} & -v_{2i_1} & v_{2i_1+8} & -v_{2i_1+8} & v_{2i_1+16} & -v_{2i_1+16} \end{bmatrix}$ |

Table 9 refers to Codebook for 1-layer CSI reporting using antenna ports 15 to 22 (the codebook for 7-layer CSI reporting using 8 antenna ports (ports 15 to 22)), namely, Rank 7 codebook for 8 antenna ports in LTE-A system.

TABLE 9

| $i_1$ | $i_2$ |
|---|---|
| | 0 |
| 0-3 | $W^{(7)}_{i_1} = \frac{1}{\sqrt{56}} \begin{bmatrix} v_{2i_1} & v_{2i_1} & v_{2i_1+8} & v_{2i_1+8} & v_{2i_1+16} & v_{2i_1+16} & v_{2i_1+24} \\ v_{2i_1} & -v_{2i_1} & v_{2i_1+8} & -v_{2i_1+8} & v_{2i_1+16} & -v_{2i_1+16} & v_{2i_1+24} \end{bmatrix}$ |

Table 10 refers to Codebook for 1-layer CSI reporting using antenna ports 15 to 22 (the codebook for 8-layer CSI reporting using 8 antenna ports (ports 15 to 22)), namely, Rank 8 codebook for 8 antenna ports in LTE-A system.

TABLE 10

| $i_1$ | $i_2$ |
|---|---|
| | 0 |
| 0 | $W^{(8)}_{i_1} =$ $\frac{1}{8} \begin{bmatrix} v_{2i_1} & v_{2i_1} & v_{2i_1+8} & v_{2i_1+8} & v_{2i_1+16} & v_{2i_1+16} & v_{2i_1+24} & v_{2i_1+24} \\ v_{2i_1} & -v_{2i_1} & v_{2i_1+8} & -v_{2i_1+8} & v_{2i_1+16} & -v_{2i_1+16} & v_{2i_1+24} & -v_{2i_1+24} \end{bmatrix}$ |

In the above tables, $\phi_n = e^{j\pi n/2}$, $v_m = [1\ e^{j2\pi m/32}\ e^{j4\pi m/32}\ e^{j6\pi m/32}]^T$, therein, $(\bullet)^T$ represents matrix transpose.

In the case of no codebook compression, PMI is defined as follows:

For 8 antenna ports and corresponding RI value which is 1, the first PMI value $i_1 \in \{0, 1, 2, \ldots, 15\}$ shall correspond to the codebook index $i_1$ in Table 3 and the second PMI value $i_2 \in \{0, 1, 2, \ldots, 15\}$ shall correspond to the codebook index $i_2$ in Table 3.

For 8 antenna ports and corresponding RI value which is 2, the first PMI value $i_1 \in \{0, 1, 2, \ldots, 15\}$ shall correspond to the codebook index $i_1$ in Table 4 and the second PMI value $i_2 \in \{0, 1, 2, \ldots, 15\}$ shall correspond to the codebook index $i_2$ in Table 4.

For 8 antenna ports and corresponding RI value which is 3, the first PMI value $i_1 \in \{0, 1, 2, 3\}$ shall correspond to the codebook index $i_1$ in Table 5 and the second PMI value $i_2 \in \{0, 1, 2, \ldots, 15\}$ shall correspond to the codebook index $i_2$ in Table 5.

For 8 antenna ports and corresponding RI value which is 4, the first PMI value $i_1 \in \{0, 1, 2, 3\}$ shall correspond to the codebook index $i_1$ in Table 6 and the second PMI value $i_2 \in \{0, 1, 2, \ldots, 15\}$ shall correspond to the codebook index $i_2$ in Table 6.

For 8 antenna ports and corresponding RI value which is 5, the first PMI value $i_1 \in \{0, 1, 2, 3\}$ shall correspond to the codebook index $i_1$ in Table 3 and the second PMI value $i_2 \in \{0\}$ shall correspond to the codebook index $i_2$ in Table 7.

For 8 antenna ports and corresponding RI value which is 6, the first PMI value $i_1 \in \{0, 1, 2, 3\}$ shall correspond to the codebook index $i_1$ in Table 4 and the second PMI value $i_2 \in \{0\}$ shall correspond to the codebook index $i_2$ in Table 8.

For 8 antenna ports and corresponding RI value which is 7, the first PMI value $i_1 \in \{0, 1, 2, 3\}$ shall correspond to the codebook index $i_1$ in Table 5 and the second PMI value $i_2 \in \{0\}$ shall correspond to the codebook index $i_2$ in Table 9.

For 8 antenna ports and corresponding RI value which is 8, the first PMI value $i_1 \in \{0\}$ shall correspond to the codebook index $i_1$ in Table 6 and the second PMI value $i_2 \in \{0\}$ shall correspond to the codebook index $i_2$ in Table 10.

LTE-A system supports PUCCH reporting mode 1-1 for 8 antenna ports to achieve the feedback for RI, wideband PMI and wideband CQI. At present, there are two PUCCH reporting mode 1-1, respectively, referred to as submode 1 and submode 2. In submode 2, RI is reported on an individual sub-frame, the first PMI, the wideband second PMI and the wideband CQI is needed to be reported in a sub-frame; the Uplink Control Information (UCI) domain that first PMI, wideband second PMI and wideband CQI report may be shown in Table 11 or Table 12.

TABLE 11

| | The number of bits | | | | | |
|---|---|---|---|---|---|---|
| | 2 antenna ports | | 4 antenna ports | | 8 antenna ports | |
| Domain | Rank = 1 | Rank = 2 | Rank = 1 | Rank >1 | Rank = 1 | Rank >1 |
| wideband CQI | 4 | 4 | 4 | 4 | 4 | 4 |
| Spatial differencing CQI | 0 | 3 | 0 | 3 | 0 | 3 |
| The first PMI value | — | — | — | — | TBD | TBD |
| The wideband second PMI value | 2 | 1 | 4 | 4 | TBD | TBD |

TABLE 12

| | The number of bits | | | | | |
|---|---|---|---|---|---|---|
| | 2 antenna ports | | 4 antenna ports | | 8 antenna ports | |
| Domain | Rank = 1 | Rank = 2 | Rank = 1 | Rank >1 | Rank = 1 | Rank >1 |
| wideband CQI | 4 | 4 | 4 | 4 | 4 | 4 |
| Spatial differencing CQI | 0 | 3 | 0 | 3 | 0 | 3 |
| wideband PMI | 2 | 1 | 4 | 4 | TBD | TBD |

TBD refers that it is not defined in current standard.

The total number of the bits in the domain cannot exceed 11. For 8 antenna ports:

When Rank=1, a total of 8 bits are required for the first PMI value and the second PMI value in Table 3, and there will be 12 bits in total plus 4 bits of wideband CQI, beyond 11 bits.

When Rank=2, a total of 8 bits are required for the first PMI value and the second PMI value in Table 4, and there will be 15 bits in total plus 4 bits of wideband CQI and 3 bits of spatial differencing CQI, beyond 11 bits.

When Rank=3, a total of 6 bits are required for the first PMI value and the second PMI value in Table 5, and there will be 13 bits in total plus 4 bits of wideband CQI and 3 bits of spatial differencing CQI, beyond 11 bits.

When Rank=4, a total of 5 bits are required for the first PMI value and the second PMI value in Table 6, and there will be 12 bits in total plus 4 bits of wideband CQI and 3 bits of spatial differencing CQI, beyond 11 bits.

LTE-A system further supports PUCCH reporting mode 2-1 for 8 antenna ports to achieve the feedback for the RI, the wideband first PMI, the wideband second PMI and the feedback for CQI or RI, the wideband second PMI, wideband CQI, the sub-band second PMI and sub-band CQI based on Precorder Type Indication (PTI); the uplink control information domain that wideband PMI and wideband CQI report is shown in Table 13.

In the procedure of realizing the objects of the present invention, at least the following problems existing in the current technologies were found:

At present, no relationship definition of the first PMI value and the wideband second PMI value with the codebook indexes $i_1$ and $i_2$ or that of PMI with the codebook indexes $i_1$ and $i_2$ after codebook compression is provided.

SUMMARY OF THE PRESENT INVENTION

The embodiments of the present invention put forward the method for transmitting channel state information and device thereof, so as to solve the problem of no corresponding relationship definition of the pre-coding matrix indicator information with the codebook index after codebook compression provided in the current technologies.

To achieve the above purpose, the embodiments of the present invention put forward a method for transmitting channel state information, which comprising:

receiving, by a terminal equipment, a control signaling sent by base station, the control signaling informs the terminal equipment that channel state information feedback is needed and feedback mode to be used by the channel state information feedback;

determining, by the terminal equipment, Rank Indication (RI) value and pre-coding matrix in compressed pre-coding

TABLE 13

| Domain | The number of bits 8 antenna ports | | | | | | | | | |
|---|---|---|---|---|---|---|---|---|---|---|
| | Rank = 1 | | Rank = 2, 3 | | Rank = 4 | | Rank = 5, 6, 7 | | Rank = 8 | |
| | PTI = 0 | PTI = 1 | PTI = 0 | PTI = 1 | PTI = 0 | PTI = 1 | PTI = 0 | PTI = 1 | PTI = 0 | PTI = 1 |
| wideband CQI | 4 | 0 | 4 | 0 | 4 | 0 | 4 | 0 | 4 | 0 |
| sub-band CQI | 0 | 4 | 0 | 4 | 0 | 4 | 0 | 4 | 0 | 4 |
| Spatial differencing CQI | 0 | 0 | 3 | 3 | 3 | 3 | 3 | 3 | 3 | 3 |
| Wideband i2 | 4 | 0 | 4 | 0 | 3 | 0 | 0 | 0 | 0 | 0 |
| Sub-band i2 | 0 | 4 | 0 | 2 | 0 | 2 | 0 | 0 | 0 | 0 |
| Sub-band label | 0 | 1 or 2 | 0 | 1 or 2 | 0 | 1 or 2 | 0 | 1 or 2 | 0 | 1 or 2 |

The total number of the bits in the domain cannot exceed 11. For 8 antenna ports:

When Rank=2, a total of 4 bits are required for the second PMI value in Table 4, and there will be 13 bits in total plus 4 bits of sub-band CQI, 3 bits of spatial differencing CQI and at most 2 bits of sub-band location indicator, beyond 11 bits.

When Rank=3, a total of 4 bits are required for the second PMI value in Table 5, and there will be 13 bits in total plus 4 bits of sub-band CQI, 3 bits of spatial differencing CQI and at most 2 bits of sub-band location indicator, beyond 11 bits.

When Rank=4, a total of 3 bits are required for the second PMI value in Table 6, and there will be 12 bits in total plus 4 bits of sub-band CQI, 3 bits of spatial differencing CQI and at most 2 bits of sub-band location indicator, beyond 11 bits.

Codebook compression shall be required for all situations mentioned above; in case of codebook compression, the relationship of the first PMI value and the wideband second PMI value with the codebook indexes $i_1$ and $i_2$ shall be redefined. Currently, no relationship definition of the first PMI value and the wideband second PMI value with the codebook indexes $i_1$ and $i_2$ or that of PMI with the codebook indexes $i_1$ and $i_2$ after codebook compression is provided.

matrix set and determining the value of corresponding pre-coding matrix indicator information according to preset corresponding relationship of the pre-coding matrix indicator information with codebook index in source codebook;

sending, by the terminal equipment, the determined RI value and the value of pre-coding matrix indicator information to the base station as per the feedback mode.

Moreover, the embodiments of the present invention further put forward a terminal equipment, which comprising:

a receiving module, used to receive control signaling sent by base station, the control signaling informs the terminal equipment that channel state information feedback is needed and feedback mode to be used by the channel state information feedback;

a setting module, used to set a corresponding relationship of pre-coding matrix indicator information with codebook index in the source codebook;

a determination module, used to determine the RI value and pre-coding matrix in compressed pre-coding matrix set and determining the value of the corresponding pre-coding matrix indicator information according to the RI value and the corresponding relationship of the pre-coding matrix indicator information with the codebook index in the source codebook set by the setting module;

a sending module, used to send the RI value and the value of pre-coding matrix indicator information determined by the determination module to the base station as per the feedback mode informed in the control signaling that receiving module receives.

Moreover, the embodiments of the present invention further put forward a method for transmitting channel state information, which comprising:

sending, by a base station, a control signaling to terminal equipment to inform the terminal equipment that channel state information feedback is needed and feedback mode to be used by the channel state information feedback;

receiving, by the base station, RI and pre-coding matrix indicator information that the terminal equipment reports as per the feedback mode;

determining, by the base station, a pre-coding matrix according to preset corresponding relationship of pre-coding matrix indicator information with codebook index in source codebook according to the received RI value and value of the pre-coding matrix indicator information.

Moreover, the embodiments of the present invention further provide a base station, which comprising:

a setting module, used to set a corresponding relationship of the pre-coding matrix indicator information with the codebook index in the source codebook;

a sending module, used to send control signaling to terminal equipment to inform the terminal equipment that channel state information feedback is needed and feedback mode to be used by the channel state information feedback;

a receiving module, used to receive RI and pre-coding matrix indicator information that terminal equipment reports as per the feedback mode that the sending module informs;

a determination module, used to determine a pre-coding matrix according to corresponding relationship of pre-coding matrix indicator information with the codebook index in the source codebook that setting module sets according to the RI value and the value of pre-coding matrix indicator information that the receiving module receives.

Compared with the present technology, the embodiments of the present invention possess the following advantages:

By applying the technical schemes of the embodiment of the present invention, in a LTE-A system using PUCCH reporting mode 1-1 submode 2 and PUCCH reporting mode 2-1, in a LTE-A system using PUCCH reporting mode 1-1, in a situation where PMI feedback for 8 antenna ports is needed to be reported in a sub-frame and PUCCH capacity is limited, therefore codebook compression is required, a corresponding relationship definition of the pre-coding matrix indicator information or the pre-coding matrix indicator information pair and the codebook index or the codebook index pair after codebook compression is provided, thus realizing the feedback and receiving of channel state information between a base station and terminal equipment.

DETAILED DESCRIPTION OF THE EMBODIMENTS OF THE PRESENT INVENTION

Based on the deficiencies of the current technical schemes referred in the background of the present invention, the embodiments of the present invention provide the channel state information transmission scheme; by applying this technical scheme, the feedback and receiving of channel state information between a base station and terminal equipment can be realized in the application scene using PUCCH reporting mode 1-1 submode 2 and PUCCH reporting mode 2-1.

Figure 1:
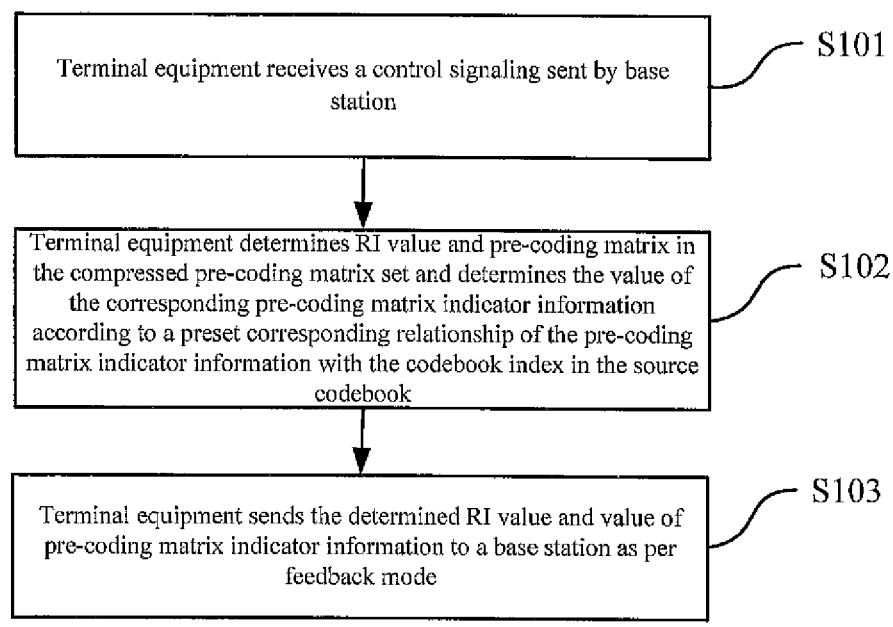
FIG. 1 is the flow diagram of the method for transmitting channel state information provided in the embodiment of the present invention at the terminal equipment.

As shown in FIG. 1, it refers to the flow diagram of the method for transmitting channel state information provided in the embodiments of the present invention, which comprises the following specific steps:

Step S101, the terminal equipment receives a control signaling sent by base station.

The control signaling informs the terminal equipment that channel state information feedback is needed and feedback mode to be used by the channel state information feedback;

As for the application scene applied in the embodiments of the present invention, before step S101, the terminal equipment further receives the broadcast information sent by base station and is informed that current base station is configured with 8 antenna ports.

Step S102, the terminal equipment determines the RI value and pre-coding matrix in the compressed pre-coding matrix set and determines the value of corresponding pre-coding matrix indicator information according to the preset corresponding relationship of pre-coding matrix indicator information with the codebook index in the source codebook.

It should be noted that, in actual application scene, the above source codebook refers to the codebook for 8 antenna ports in LTE-A system, to be specific; similar cases may happen in the later description of the embodiments of the present invention, while such name change will not affect the scope of the patent protection of the present invention. In the meantime, to simplify description, the illustration of the source codebook here shall be referred in the later description of the present invention and will not be described.

In actual application scene, the specific implementation of the step comprises the following four conditions:

Condition I, when the pre-coding matrix indicator information that terminal equipment determines specifically comprises the first pre-coding matrix indicator information and the second pre-coding matrix indicator information, the terminal equipment determines the value of the first pre-coding matrix indicator information and the second pre-coding matrix indicator information according to the RI value and the preset corresponding relationship of the first pre-coding matrix indicator information and the second pre-coding matrix indicator information with the two codebook indexes $i_1$ and $i_2$ in the source codebook.

In actual application scene, depending on RI value, the corresponding relationship in the condition comprises the following specific types:

(1) When the RI value that terminal equipment determines is 1, the above corresponding relationship specifically comprises:

The value of the first pre-coding matrix indicator information $i_1 \in \{0, 1, \ldots, 7\}$ corresponds to the codebook index $\lfloor i_1/2 \rfloor$ in the Rank 1 source codebook, and the value of the second pre-coding matrix indicator information $i_2 \in \{0, 1, \ldots, 15\}$ corresponds to the codebook index 2 in the Rank 1 source codebook; or, The value of the first pre-coding matrix indicator information $i_1 \in \{0, 1, \ldots, 7\}$ corresponds to the codebook index $2i_1$ in the Rank 1 source codebook, and the value of the second pre-coding matrix indicator information $i_2 \in \{0, 1, \ldots, 15\}$ corresponds to the codebook index $i_2$ in the Rank 1 source codebook; or, The value of the first pre-coding matrix indicator information $i_1 \in \{0, 1, \ldots, 15\}$ corresponds to the codebook index $i_1$ in the Rank 1 source codebook, and the value of the second pre-coding matrix indicator information $i_2 \in \{0, 1, \ldots, 7\}$ corresponds to the codebook index $i_2$ in the Rank 1 source codebook; or, The value of the first pre-coding matrix indicator information $i_1 \in \{0, 1, \ldots, 15\}$ corresponds to the codebook index $i_1$ in the Rank 1 source codebook, when the value of the second pre-coding matrix indicator information is $i_2 \in \{0, 1, 2, 3\}$, the value of the second pre-coding matrix indicator information corresponds to the codebook index $i_2$ in the Rank 1 source codebook, and when the value of the second pre-coding matrix indicator information is $i_2 \in \{4, 5, 6, 7\}$, the value of the second pre-coding matrix indicator information corresponds to codebook index $i_2+8$ in the Rank 1 source codebook; or, The value of the first pre-coding matrix indicator information $i_1 \in \{0, 1, \ldots, 15\}$ corresponds to the codebook index $i_1$ in the Rank 1 source codebook, and the value of the second pre-coding matrix indicator information $i_2 \in \{0, 1, \ldots, 7\}$ corresponds to the codebook index $i_2+4$ in the Rank 1 source codebook; or, The value of the first pre-coding matrix indicator information $i_2 \in \{0, 1, \ldots, 15\}$ corresponds to the codebook index $i_1$ in the Rank 1 source codebook, and the value of the second pre-coding matrix indicator information $i_2 \in \{0, 1, \ldots, 7\}$ corresponds to the codebook index $i_2+8$ in the Rank 1 source codebook; or, The value of the first pre-coding matrix indicator information $i_1 \in \{0, 1, \ldots, 7\}$ corresponds to the codebook index $\lfloor i_1/2 \rfloor$ in the Rank 1 source codebook, and the value of the second pre-coding matrix indicator information $i_2 \in \{0, 1\}$ corresponds to the codebook index $2i_2$ in the Rank 1 source codebook; or, The value of the first pre-coding matrix indicator information $i_1 \in \{0, 1, \ldots, 7\}$ corresponds to the codebook index $2i_1$ in the Rank 1 source codebook, and the value of the second pre-coding matrix indicator information $i_2 \in \{0, 1\}$ corresponds to the codebook index $2i_2$ in the Rank 1 source codebook; or, The value of the first pre-coding matrix indicator information $i_1 \in \{0, 1, \ldots, 7\}$ corresponds to the codebook index $\lfloor i_1/2 \rfloor$ in the Rank 1 source codebook, and the value of the second pre-coding matrix indicator information $i_2 \in \{0, 1\}$ corresponds to the codebook index $2i_2+4$ in the Rank 1 source codebook; or, The value of the first pre-coding matrix indicator information $i_1 \in \{0, 1, \ldots, 7\}$ corresponds to the codebook index $2i_1$ in the Rank 1 source codebook, and the value of the second pre-coding matrix indicator information $i_2 \in \{0, 1\}$ corresponds to the codebook index $2i_2+4$ in the Rank 1 source codebook; or, The value of the first pre-coding matrix indicator information $i_1 \in \{0, 1, \ldots, 7\}$ corresponds to the codebook index $\lfloor i_1/2 \rfloor$ in the Rank 1 source codebook, and the value of the second pre-coding matrix indicator information $i_2 \in \{0, 1\}$ corresponds to the codebook index $2i_2+8$ in the Rank 1 source codebook; or, The value of the first pre-coding matrix indicator information $i_1 \in \{0, 1, \ldots, 7\}$ corresponds to the codebook index $2i_1$ in the Rank 1 source codebook, and the value of the second pre-coding matrix indicator information $i_2 \in \{0, 1\}$ corresponds to the codebook index $2i_2+8$ in the Rank 1 source codebook; or, The value of the first pre-coding matrix indicator information $i_1 \in \{0, 1, \ldots, 7\}$ corresponds to the codebook index $\lfloor i_1/2 \rfloor$ in the Rank 1 source codebook, and the value of the second pre-coding matrix indicator information $i_2 \in \{0, 1\}$ corresponds to the codebook index $2i_2+12$ in the Rank 1 source codebook; or, The value of the first pre-coding matrix indicator information $i_1 \in \{0, 1, \ldots, 7\}$ corresponds to the codebook index $2i_1$ in the Rank 1 source codebook, and the value of the second pre-coding matrix indicator information $i_2 \in \{0, 1\}$ corresponds to the codebook index $2i_2+12$ in the Rank 1 source codebook; or, The value of the first pre-coding matrix indicator information $i_1 \in \{0, 1, \ldots, 7\}$ corresponds to the codebook index $\lfloor i_{1/2} \rfloor$ in the Rank 1 source codebook, when the value of the second pre-coding matrix indicator information is $i_2 \in \{0, 1\}$, the value of the second pre-coding matrix indicator information corresponds to the codebook index $2i_2$ in the Rank 1 source codebook, and when the value of the second pre-coding matrix indicator information is $i_2 \in \{3, 4\}$, the value of the second pre-coding matrix indicator information corresponds to the codebook index $2i_2+5$ in the Rank 1 source codebook; or, The value of the first pre-coding matrix indicator information $i_1 \in \{0, 1, \ldots, 7\}$ corresponds to the codebook index $2i_1$ in the Rank 1 source codebook, when the value of the second pre-coding matrix indicator information is $i_2 \in \{0, 1\}$, the value of the second pre-coding matrix indicator information corresponds to the codebook index $2i_2$ in the Rank 1 source codebook, and when the value of the second pre-coding matrix indicator information is $i_2 \in \{3, 4\}$, the value of the second pre-coding matrix indicator information corresponds to the codebook index $2i_2+5$ in the Rank 1 source codebook; or, The value of the first pre-coding matrix indicator information $i_1 \in \{0, 1, \ldots, 15\}$ corresponds to the codebook index $i_1$ in the Rank 1 source codebook, and the value of the second pre-coding matrix indicator information $i_2 \in \{0, 1\}$ corresponds to the codebook index $2i_2$ in the Rank 1 source codebook; or, The value of the first pre-coding matrix indicator information $i_1 \in \{0, 1, \ldots, 15\}$ corresponds to the codebook index $i_1$ in the Rank 1 source codebook, and the value of the second pre-coding matrix indicator information $i_2 \in \{0, 1\}$ corresponds to the codebook index $8+2i_2$ in the Rank 1 source codebook; or, The value of the first pre-coding matrix indicator information $i_2 \in \{0, 1, \ldots, 7\}$ corresponds to the codebook index $\lfloor i_1/2 \rfloor$ in the Rank 1 source codebook, when the value of the second pre-coding matrix indicator information is $i_2 \in \{0, 1\}$, the value of the second pre-coding matrix indicator information corresponds to the codebook index $2i_2$ in the Rank 1 source codebook, and when the value of the second pre-coding matrix indicator information is $i_2 \in \{2, 3\}$, the value of the second pre-coding matrix indicator information corresponds to the codebook index $8+2i_2$ in the Rank 1 source codebook; or, The value of the first pre-coding matrix indicator information $i_1 \in \{0, 1, \ldots, 7\}$ corresponds to the codebook index $2i_1$ in the Rank 1 source codebook, when the value of the second pre-coding matrix indicator information is $i_2 \in \{0, 1\}$, the value of the second pre-coding matrix indicator information corresponds to the codebook index $2i_2$ in the Rank 1 source codebook, and when the value of the second pre-coding matrix indicator information is $i_2 \in \{2, 3\}$, the value of the second pre-coding matrix indicator information corresponds to the codebook index $8+2i_2$ in the Rank 1 source codebook; or, The value of the first pre-coding matrix indicator information $i_1 \in \{0, 1, \ldots, 7\}$ corresponds to the codebook index $\lfloor i_1/2 \rfloor$ in the Rank 1 source codebook, and the value of the second pre-coding matrix indicator information $i_2 \in \{0, 1\}$ corresponds to the codebook index $8i_2$ in the Rank 1 source codebook; or, The value of the first pre-coding matrix indicator information $i_1 \in \{0, 1, \ldots, 7\}$ corresponds to the codebook index $2i_1$ in the Rank 1 source codebook, and the value of the second pre-coding matrix indicator information $i_2 \in \{0, 1\}$ corresponds to the codebook index $8i_2$ in the Rank 1 source codebook; or, The value of the first pre-coding matrix indicator information $i_1 \in \{0, 1, \ldots, 15\}$ corresponds to the codebook index $i_1$ in the Rank 1 source codebook, and the value of the second pre-coding matrix indicator information $i_2=0$ corresponds to the codebook index $i_2=0$ in the Rank 1 source codebook;

Therein, $\lfloor x \rfloor$ represents the greatest integer no greater than x.

(2) When the RI value that terminal equipment determines is 2, the above corresponding relationship specifically comprises:

The value of the first pre-coding matrix indicator information $i_1 \in \{0, 1, \ldots, 7\}$ corresponds to the codebook index $\lfloor i_1/2 \rfloor$ in the Rank 2 source codebook, and the value of the second pre-coding matrix indicator information $i_2 \in \{0, 1\}$ corresponds to the codebook index $i_2$ in the Rank 2 source codebook; or, The value of the first pre-coding matrix indicator information $i_1 \in \{0, 1, \ldots, 7\}$ corresponds to the codebook index $2i_1$ in the Rank 2 source codebook, and the value of the second pre-coding matrix indicator information $i_2 \in \{0, 1\}$ corresponds to the codebook index $i_2$ in the Rank 2 source codebook; or, The value of the first pre-coding matrix indicator information $i_1 \in \{0, 1, \ldots, 7\}$ corresponds to the codebook index $\lfloor i_1/2 \rfloor$ in the Rank 2 source codebook, and the value of the second pre-coding matrix indicator information $i_2 \in \{0, 1\}$ corresponds to the codebook index $4+i_2$ in the Rank 2 source codebook; or, The value of the first pre-coding matrix indicator information $i_1 \in \{0, 1, \ldots, 7\}$ corresponds to the codebook index $2i_1$ in the Rank 2 source codebook, and the value of the second pre-coding matrix indicator information $i_2 \in \{0, 1\}$ corresponds to the codebook index $4+i_2$ in the Rank 2 source codebook; or, The value of the first pre-coding matrix indicator information $i_1 \in \{0, 1, \ldots, 7\}$ corresponds to the codebook index $\lfloor i_1/2 \rfloor$ in the Rank 2 source codebook, and the value of the second pre-coding matrix indicator information $i_2 \in \{0, 1\}$ corresponds to the codebook index $4i_2$ in the Rank 2 source codebook; or, The value of the first pre-coding matrix indicator information $i_1 \in \{0, 1, \ldots, 7\}$ corresponds to the codebook index $2i_1$ in the Rank 2 source codebook, and the value of the second pre-coding matrix indicator information $i_2 \in \{0, 1\}$ corresponds to the codebook index $4i_2$ in the Rank 2 source codebook; or, The value of the first pre-coding matrix indicator information $i_1 \in \{0, 1, \ldots, 15\}$ corresponds to the codebook index $i_1$ in the Rank 2 source codebook, and the value of the second pre-coding matrix indicator information $i_2=0$ corresponds to the codebook index $i_2=0$ in the Rank 2 source codebook; or, The value of the first pre-coding matrix indicator information $i_1 \in \{0, 1, \ldots, 15\}$ corresponds to the codebook index $i_1$ in the Rank 2 source codebook, and the value of the second pre-coding matrix indicator information $i_2=0$ corresponds to the codebook index $i_2=4$ in the Rank 2 source codebook; or, The value of the first pre-coding matrix indicator information $i_1 \in \{0, 1, \ldots, 15\}$ corresponds to the codebook index $i_1$ in the Rank 2 source codebook, and the value of the second pre-coding matrix indicator information $i_2 \in \{0, 1, 2, 3\}$ corresponds to the codebook index $2i_2$ in the Rank 2 source codebook; or, The value of the first pre-coding matrix indicator information $i_1 \in \{0, 1, \ldots, 7\}$ corresponds to the codebook index $\lfloor i_1/2 \rfloor$ in the Rank 2 source codebook, and the value of the second pre-coding matrix indicator information $i_2 \in \{0, 1\}$ corresponds to the codebook index $5i_2$ in the Rank 2 source codebook; or, The value of the first pre-coding matrix indicator information $i_1 \in \{0, 1, \ldots, 7\}$ corresponds to the codebook index $2i_1$ in the Rank 2 source codebook, and the value of the second pre-coding matrix indicator information $i_2 \in \{0, 1\}$ corresponds to the codebook index $5i_2$ in the Rank 2 source codebook;

Therein, $\lfloor x \rfloor$ represents the greatest integer no greater than x.

(3) When the RI value that terminal equipment determines is 3, the above corresponding relationship specifically comprises:

The value of the first pre-coding matrix indicator information $i_1 \in \{0, 1, 2, 3\}$ corresponds to the codebook index $i_1$ in the Rank 3 source codebook, and the value of the second pre-coding matrix indicator information $i_2 \in \{0, 1, 2, 3\}$ corresponds to the codebook index $4i_2$ in the Rank 3 source codebook; or, The value of the first pre-coding matrix indicator information $i_1 \in \{0, 1, 2, 3\}$ corresponds to the codebook index $i_1$ in the Rank 3 source codebook, and the value of the second pre-coding matrix indicator information $i_2 \in \{0, 1, 2, 3\}$ corresponds to the codebook index $4i_2+1$ in the Rank 3 source codebook; or, The value of the first pre-coding matrix indicator information $i_1 \in \{0, 1, 2, 3\}$ corresponds to the codebook index $i_1$ in the Rank 3 source codebook, and the value of the second pre-coding matrix indicator information $i_2 \in \{0, 1, 2, 3\}$ corresponds to the codebook index $4i_2+2$ in the Rank 3 source codebook; or, The value of the first pre-coding matrix indicator information $i_1 \in \{0, 1, 2, 3\}$ corresponds to the codebook index $i_1$ in the Rank 3 source codebook, and the value of the second pre-coding matrix indicator information $i_2 \in \{0, 1, 2, 3\}$ corresponds to the codebook index $4i_2+3$ in the Rank 3 source codebook; or, The value of the first pre-coding matrix indicator information $i_1 \in \{0, 1\}$ corresponds to the codebook index $\lfloor i_1/2 \rfloor$ in the Rank 3 source codebook, and the value of the second pre-coding matrix indicator information $i_2 \in \{0, 1, \ldots, 7\}$ corresponds to the codebook index $4 \cdot \lfloor i_2/2 \rfloor + (i_2 \bmod 2)$ in the Rank 3 source codebook; or, The value of the first pre-coding matrix indicator information $i_1 \in \{0, 1\}$ corresponds to the codebook index $2i_1$ in the Rank 3 source codebook, and the value of the second pre-coding matrix indicator information $i_2 \in \{0, 1, \ldots, 7\}$ corresponds to the codebook index $4 \cdot \lfloor i_2/2 \rfloor + (i_2 \bmod 2)$ in the Rank 3 source codebook; or, The value of the first pre-coding matrix indicator information $i_1 \in \{0, 1\}$ corresponds to the codebook index $\lfloor i_1/2 \rfloor$ in the Rank 3 source codebook, and the value of the second pre-coding matrix indicator information $i_2 \in \{0, 1, \ldots, 7\}$ corresponds to the codebook index $2i_2$ in the Rank 3 source codebook; or, The value of the first pre-coding matrix indicator information $i_1 \in \{0, 1\}$ corresponds to the codebook index $2i_1$ in the Rank 3 source codebook, and the value of the second pre-coding matrix indicator information $i_2 \in \{0, 1, \ldots, 7\}$ corresponds to the codebook index $2i_2$ in the Rank 3 source codebook; or, The value of the first pre-coding matrix indicator information $i_1 \in \{0, 1\}$ corresponds to the codebook index $\lfloor i_1/2 \rfloor$ in the Rank 3 source codebook, and the value of the second pre-coding matrix indicator information $i_2 \in \{0, 1, \ldots, 7\}$ corresponds to the codebook index $4 \cdot \lfloor i_2/2 \rfloor + 3 \cdot (i_2 \bmod 2)$ in the Rank 3 source codebook; or, The value of the first pre-coding matrix indicator information $i_1 \in \{0, 1\}$ corresponds to the codebook index $2i_1$ in the Rank 3 source codebook, and the value of the second pre-coding matrix indicator information $i_2 \in \{0, 1, \ldots, 7\}$ corresponds to the codebook index $4 \cdot \lfloor i_2/2 \rfloor + 3 \cdot (i_2 \bmod 2)$ in the Rank 3 source codebook; or, The value of the first pre-coding matrix indicator information $i_1 \in \{0, 1\}$ corresponds to the codebook index $\lfloor i_1/2 \rfloor$ in the Rank 3 source codebook, and the value of the second pre-coding matrix indicator information $i_2 \in \{0, 1, \ldots, 7\}$ corresponds to the codebook index $2i_2+1$ in the Rank 3 source codebook; or, The value of the first pre-coding matrix indicator information $i_1 \in \{0, 1\}$ corresponds to the codebook index $2i_1$ in the Rank 3 source codebook, and the value of the second pre-coding matrix indicator information $i_2 \in \{0, 1, \ldots, 7\}$ corresponds to the codebook index $2i_2+1$ in the Rank 3 source codebook; or, The value of the first pre-coding matrix indicator information $i_1 \in \{0, 1\}$ corresponds to the codebook index $\lfloor i_1/2 \rfloor$ in the Rank 3 source codebook, and the value of the second pre-coding matrix indicator information $i_2 \in \{0, 1, \ldots, 7\}$ corresponds to the codebook index $8 \lfloor i_2/4 \rfloor + i_2$ in the Rank 3 source codebook; or, The value of the first pre-coding matrix indicator information $i_1 \in \{0, 1\}$ corresponds to the codebook index $2i_1$ in the Rank 3 source codebook, and the value of the second pre-coding matrix indicator information $i_2 \in \{0, 1, \ldots, 7\}$ corresponds to the codebook index $4 \lfloor i_2/4 \rfloor + i_2$ in the Rank 3 source codebook; or, The value of the first pre-coding matrix indicator information $i_1 \in \{0, 1, 2, 3\}$ corresponds to the codebook index $i_1$ in the Rank 3 source codebook, and the value of the second pre-coding matrix indicator information $i_2 \in \{0, 1, 2, 3\}$ corresponds to the codebook index $i_2$ in the Rank 3 source codebook; or, The value of the first pre-coding matrix indicator information $i_1 \in \{0, 1, 2, 3\}$ corresponds to the codebook index $i_1$ in the Rank 3 source codebook, and the value of the second pre-coding matrix indicator information $i_2 \in \{0, 1, 2, 3\}$ corresponds to the codebook index $i_2+4$ in the Rank 3 source codebook; or, The value of the first pre-coding matrix indicator information $i_1 \in \{0, 1, 2, 3\}$ corresponds to the codebook index $i_1$ in the Rank 3 source codebook, and the value of the second pre-coding matrix indicator information $i_2 \in \{0, 1, 2, 3\}$ corresponds to the codebook index $i_2+8$ in the Rank 3 source codebook; or, The value of the first pre-coding matrix indicator information $i_1 \in \{0, 1, 2, 3\}$ corresponds to the codebook index $i_1$ in the Rank 3 source codebook, and the value of the second pre-coding matrix indicator information $i_2 \in \{0, 1, 2, 3\}$ corresponds to the codebook index $i_2+12$ in the Rank 3 source codebook; or, The value of the first pre-coding matrix indicator information $i_1 \in \{0, 1, 2, 3\}$ corresponds to the codebook index $i_1$ in the Rank 3 source codebook, and the value of the second pre-coding matrix indicator information $i_2 \in \{0, 1, 2, 3\}$ corresponds to the codebook index $8 \cdot \lfloor i_2/2 \rfloor + (i_2 \bmod 2)$ in the Rank 3 source codebook; or, The value of the first pre-coding matrix indicator information $i_1 \in \{0, 1, 2, 3\}$ corresponds to the codebook index $i_1$ in the Rank 3 source codebook, and the value of the second pre-coding matrix indicator information $i_2 \in \{0, 1, 2, 3\}$ corresponds to the codebook index $8 \cdot \lfloor i_2/2 \rfloor + (i_2 \bmod 2) + 2$ in the Rank 3 source codebook;

Therein, $\lfloor x \rfloor$ represents the greatest integer no greater than x and i mod 2 represents the remainder of dividing i by 2.

(4) When the RI value that terminal equipment determines is 4, the above corresponding relationship specifically comprises:

The value of the first pre-coding matrix indicator information $i_1 \in \{0, 1, 2, 3\}$ corresponds to the codebook index $i_1$ in the Rank 4 source codebook, and the value of the second pre-coding matrix indicator information $i_2 \in \{0, 1, 2, 3\}$ corresponds to the codebook index $2i_2$ in the Rank 4 source codebook; or, The value of the first pre-coding matrix indicator information $i_1 \in \{0, 1, 2, 3\}$ corresponds to the codebook index $i_2$ in the Rank 4 source codebook, and the value of the second pre-coding matrix indicator information $i_2 \in \{0, 1, 2, 3\}$ corresponds to the codebook index $4 \cdot \lfloor i_2/2 \rfloor + 3(i_2 \bmod 2)$ in the Rank 4 source codebook; or, The value of the first pre-coding matrix indicator information $i_1 \in \{0, 1, 2, 3\}$ corresponds to the codebook index $i_1$ in the Rank 4 source codebook, and the value of the second pre-coding matrix indicator information $i_2 \in \{0, 1, 2, 3\}$ corresponds to the codebook index $2+i_2$ in the Rank 4 source codebook; or, The value of the first pre-coding matrix indicator information $i_1 \in \{0, 1\}$ corresponds to the codebook index $\lfloor i_1/2 \rfloor$ in the Rank 4 source codebook, and the value of the second pre-coding matrix indicator information $i_2 \in \{0, 1, \ldots, 7\}$ corresponds to the codebook index $i_2$ in the Rank 4 source codebook; or, The value of the first pre-coding matrix indicator information $i_1 \in \{0, 1\}$ corresponds to the codebook index $2i_1$ in the Rank 4 source codebook, and the value of the second pre-coding matrix indicator information $i_2 \in \{0, 1, \ldots, 7\}$ corresponds to the codebook index 2 in the Rank 4 source codebook;

Therein, $\lfloor x \rfloor$ represents the greatest integer no greater than x and i mod 2 represents the remainder of dividing i by 2.

To be specific, as for PUCCH reporting mode 1-1 submode 2, the relationship is of the value of the first pre-coding matrix indicator information and the value of the second pre-coding matrix indicator information with the codebook indexes $i_1$ and $i_2$ can be expressed as:

When the RI is equal to 1, the value of the first pre-coding matrix indicator information $i_1 \in \{0, 1, \ldots, 7\}$ corresponds to the codebook index $2i_1$ in the Rank 1 source codebook, and the value of the second pre-coding matrix indicator information $i_2 \in \{0, 1\}$ corresponds to the codebook index $2i_2$ in the Rank 1 source codebook;

When the RI is equal to 2, the value of the first pre-coding matrix indicator information $i_1 \in \{0, 1, \ldots, 7\}$ corresponds to the codebook index $2i_1$ in the Rank 2 source codebook, and the value of the second pre-coding matrix indicator information $i_2 \in \{0, 1\}$ corresponds to the codebook index $i_2$ in the Rank 2 source codebook;

When the RI is equal to 3, the value of the first pre-coding matrix indicator information $i_1 \in \{0, 1\}$ corresponds to the codebook index $2i_1$ in the Rank 3 source codebook, and the value of the second pre-coding matrix indicator information $i_2 \in \{0, 1, \ldots, 7\}$ corresponds to the codebook index $4\lfloor i_2/4 \rfloor + i_2$ in the Rank 3 source codebook;

When the RI is equal to 4, the value of the first pre-coding matrix indicator information $i_1 \in \{0, 1\}$ corresponds to the codebook index $2i_1$ in the Rank 4 source codebook, and the value of the second pre-coding matrix indicator information $i_2 \in \{0, 1, \ldots, 7\}$ corresponds to the codebook index $i_2$ in the Rank 4 source codebook.

As no codebook compression will be required in the case that RI>4, the corresponding relationship of the value of the first pre-coding matrix indicator information and the value of the second pre-coding matrix indicator information with the codebook indexes $i_1$ and $i_2$ without codebook compression can be applied.

Accordingly, as for PUCCH reporting mode 1-1 submode 2, the relationship of the first PMI value and the second PMI value with the codebook indexes $i_1$ and $i_2$ is shown in Table 14.

TABLE 14

| | The relationship of the first PMI with the codebook index $i_1$ | | The relationship of the second PMI with the codebook index $i_2$ | | |
|---|---|---|---|---|---|
| RI | The first PMI value $I_{PMI1}$ | Codebook index $i_1$ | The second PMI value $I_{PMI2}$ | Codebook index $i_2$ | Total number of bits |
| 1 | 0-7 | $2I_{PMI1}$ | 0-1 | $2I_{PMI2}$ | 4 |
| 2 | 0-7 | $2I_{PMI1}$ | 0-1 | $I_{PMI2}$ | 4 |
| 3 | 0-1 | $2I_{PMI1}$ | 0-7 | $4\lfloor I_{PMI2}/4 \rfloor + I_{PMI2}$ | 4 |
| 4 | 0-1 | $2I_{PMI1}$ | 0-7 | $I_{PMI2}$ | 4 |
| 5 | 0-3 | $I_{PMI1}$ | 0 | 0 | 2 |
| 6 | 0-3 | $I_{PMI1}$ | 0 | 0 | 2 |
| 7 | 0-3 | $I_{PMI1}$ | 0 | 0 | 2 |
| 8 | 0 | 0 | 0 | 0 | 0 |

To be specific, as for PUCCH reporting mode 2-1, because the value of the first pre-coding matrix indicator information does not require codebook compression, the relationship of the value of the first pre-coding matrix indicator information with the codebook index $i_1$ without codebook compression is applied; the relationship of the value of the second pre-coding matrix indicator information with the codebook index $i_2$ can be expressed as:

When the RI is equal to 2, the value of the first pre-coding matrix indicator information $i_1 \in \{0, 1, \ldots, 15\}$ corresponds to the codebook index $i_1$ in the Rank 2 source codebook, and the value of the second pre-coding matrix indicator information $i_2 \in \{0, 1, 2, 3\}$ corresponds to the codebook index $2i_1$ in the Rank 2 source codebook;

When the RI is equal to 3, the value of the first pre-coding matrix indicator information $i_1 \in \{0, 1, 2, 3\}$ corresponds to the codebook index $i_1$ in the Rank 3 source codebook, and the value of the second pre-coding matrix indicator information $i_2 \in \{0, 1, 2, 3\}$ corresponds to the codebook index $8 \cdot \lfloor i_2/2 \rfloor + (i_2 \mod 2) + 2$ in the Rank 3 source codebook;

When the RI is equal to 4, the value of the first pre-coding matrix indicator information $i_1 \in \{0, 1, 2, 3\}$ corresponds to the codebook index $i_1$ in the Rank 4 source codebook, and the value of the second pre-coding matrix indicator information $i_2 \in \{0, 1, 2, 3\}$ corresponds to the codebook index $2i_2$ in the Rank 4 source codebook;

As no codebook compression will be required in the case that RI=1 and RI>4, the corresponding relationship of the value of the first pre-coding matrix indicator information and the value of the second pre-coding matrix indicator information with the codebook indexes $i_1$ and $i_2$ without codebook compression can be applied.

Accordingly, as for PUCCH reporting mode 2-1, the relationship of the second PMI value with the codebook index $i_2$ is shown in Table 15.

TABLE 15

| | The relationship of the second PMI with the codebook index $i_2$ | |
|---|---|---|
| RI | The second PMI value $I_{PMI2}$ | Codebook index $i_2$ |
| 1 | 0-15 | $I_{PMI2}$ |
| 2 | 0-3 | $2I_{PMI2}$ |
| 3 | 0-3 | $8 \cdot \lfloor I_{PMI2}/2 \rfloor + (I_{PMI2} \mod 2) + 2$ |
| 4 | 0-3 | $2I_{PMI2}$ |
| 5 | 0 | 0 |
| 6 | 0 | 0 |
| 7 | 0 | 0 |
| 8 | 0 | 0 |

Condition II, when the pre-coding matrix indicator information to be determined by the terminal equipment specifically refers to a piece of pre-coding matrix indicator information, the terminal equipment determines the value of the pre-coding matrix indicator information according to the RI value and the preset corresponding relationship of the pre-coding matrix indicator information with the codebook index pair $(i_1, i_2)$ composed of the two codebook indexes in the source codebook.

To be specific, when the RI value that terminal equipment determines is 1, the corresponding relationship in the present condition comprises:

The value of the pre-coding matrix indicator information $i \in \{0, 1, \ldots, 15\}$ corresponds to the codebook index pair $(i_1, i_2)$ in the Rank 1 source codebook, therein, $i_1 = i$ and $i_2 = 2 \cdot (i \mod 2)$; or, The value of the pre-coding matrix indicator information $i \in \{0, 1, \ldots, 15\}$ corresponds to the codebook index pair $(i_1, i_2)$ in the Rank 1 source codebook, therein, $i_1 = i$ and $i_2 = 8 + 2 \cdot (i \mod 2)$; or, The value of the pre-coding matrix indicator information $i \in \{0, 1, \ldots, 15\}$ corresponds to the codebook index pair $(i_1, i_2)$ in the Rank 1 source codebook, therein, $i_1 = i$ and $i_2 = i \mod 4$; or, The value of the pre-coding matrix indicator information $i \in \{0, 1, \ldots, 15\}$ corresponds to the codebook index pair $(i_1, i_2)$ in the Rank 1 source codebook, therein, $i_1 = i$ and $i_2 = 8 + 2 \cdot (i \mod 4)$;

Therein, i mod 2 represents the remainder of dividing i by 2 and i mod 4 represents the remainder of dividing i by 4.

Condition III, when the pre-coding matrix indicator information to be determined by the terminal equipment specifically comprises the first pre-coding matrix indicator information and the second pre-coding matrix indicator information, the terminal equipment determines the value of the first pre-coding matrix indicator information and the second pre-coding matrix indicator information according to the RI value and the preset corresponding relationship of the pre-coding matrix indicator information pair composed of the first pre-coding matrix indicator information and the second pre-coding matrix indicator information with the codebook index pair $(i_1, i_2)$ composed of the two codebook indexes in the source codebook.

Condition IV, when the pre-coding matrix indicator information to be determined by the terminal equipment specifically refers to a piece of pre-coding matrix indicator information, the terminal equipment determines the value of the pre-coding matrix indicator information according to the RI value and the preset corresponding relationship of the pre-coding matrix indicator information and the two codebook indexes $i_1$ and $i_2$ in the source codebook.

There is no need to enumerate specific corresponding relationship rules for condition III and condition IV; all the rules determined in line with above corresponding relationship belong to the scope of the patent protection of the present invention.

It should be noted that, various corresponding relationships mentioned above refer to the description of the corresponding relationship to be applied depending on the RI value. In specific application scene, one or more of the above corresponding relationships can be optionally selected for combination; the adjustment on the technical schemes due to selection difference will not affect the scope of the patent protection of the present invention.

Step S103, the terminal equipment sends the determined RI value and the value of pre-coding matrix indicator information as per the feedback mode to the base station.

Figure 2:
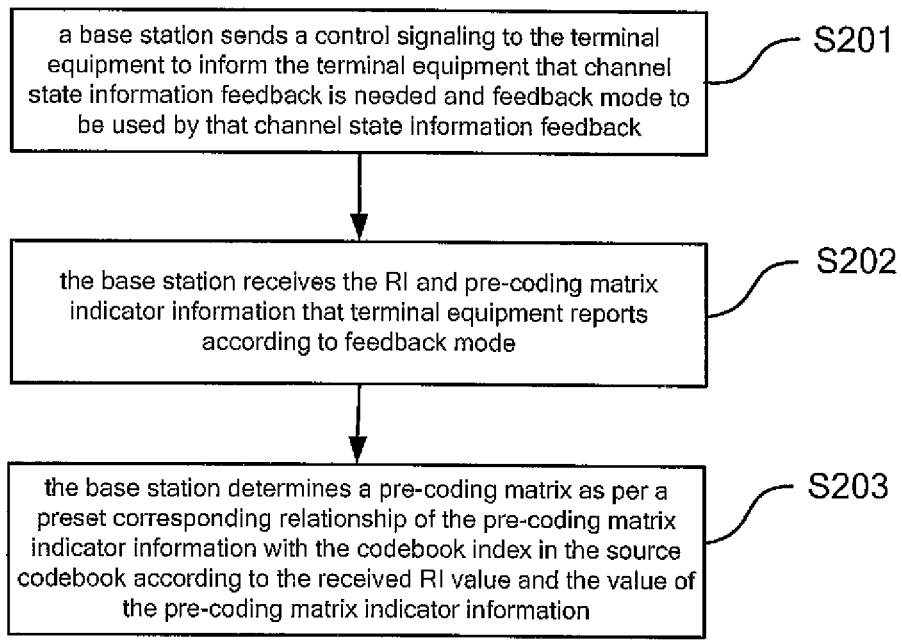
FIG. 2 is the flow diagram of method for transmitting channel state information provided in the embodiment of the present invention at the base station.

The above procedure is the implementation process of the method for transmitting channel state information provided in the embodiments of the present invention at the terminal equipment. The embodiment of the present invention further provides the implementation process of the channel state information receiving method at the base station below; the flow diagram is shown in FIG. 2, which comprises the following specific steps:

Step S201, a base station sends a control signaling to the terminal equipment to inform the terminal equipment that channel state information feedback is needed and feedback mode to be used by the channel state information feedback.

Step S202, the base station receives the RI and pre-coding matrix indicator information that terminal equipment reports as per the feedback mode.

Step S203, the base station determines a pre-coding matrix according to the preset corresponding relationship of the pre-coding matrix indicator information with the codebook index in the source codebook according to the received RI value and the value of pre-coding matrix indicator information.

In actual application scene, corresponding to the above-mentioned step S102, the specific implementation process of this step comprises the following four conditions:

Condition I, when the pre-coding matrix indicator information reported by the terminal equipment that base station receives specifically comprises the first pre-coding matrix indicator information and the second pre-coding matrix indicator information, the base station determines a pre-coding matrix according to the RI value and the preset corresponding relationship of the first pre-coding matrix indicator information and the second pre-coding matrix indicator information with the two codebook indexes $i_1$ and $i_2$ in the source codebook.

When the RI value is 1, the base station determines a pre-coding matrix according to the value of the first pre-coding matrix indicator information and the second pre-coding matrix indicator information; the corresponding relationship based on is consistent with (1) in the Condition I of the description of the corresponding relationship in the above-mentioned step S102.

When the RI value is 2, the base station determines a pre-coding matrix according to the value of the first pre-coding matrix indicator information and the second pre-coding matrix indicator information; the corresponding relationship based on is consistent with (2) in the Condition I of the description of the corresponding relationship in the above-mentioned step S102.

When the RI value is 3, the base station determines a pre-coding matrix according to the value of the first pre-coding matrix indicator information and the second pre-coding matrix indicator information; the corresponding relationship based on is consistent with (3) in the Condition I of the description of the corresponding relationship in the above-mentioned step S102.

When the RI value is 4, the base station determines a pre-coding matrix according to the value of the first pre-coding matrix indicator information and the second pre-coding matrix indicator information; the corresponding relationship based on is consistent with (4) in the Condition I of the description of the corresponding relationship in the above-mentioned step S102.

Condition II, when the pre-coding matrix indicator information reported by the terminal equipment that base station receives specifically refers to a piece of pre-coding matrix indicator information, the base station determines a pre-coding matrix according to the RI value and the preset corresponding relationship of the pre-coding matrix indicator information with the codebook index pair $(i_1, i_2)$ composed of the two codebook indexes in the source codebook.

When the RI value is 1, the base station determines a pre-coding matrix according to the value of the pre-coding matrix indicator information; the corresponding relationship based on is consistent with the Condition II of the description of the corresponding relationship in the above-mentioned step S102.

Condition III, when the pre-coding matrix indicator information reported by the terminal equipment that base station receives specifically comprises the pre-coding matrix indicator information pair composed of the first pre-coding matrix indicator information and the second pre-coding matrix indicator information, the base station determines a pre-coding matrix according to the RI value and the preset corresponding relationship of the pre-coding matrix indicator information pair composed of the first pre-coding matrix indicator information and the second pre-coding matrix indicator information with the codebook index pair $(i_1, i_2)$ composed of the two codebook indexes in the source codebook.

Condition IV, when the pre-coding matrix indicator information reported by the terminal equipment that base station receives specifically refers to a pre-coding matrix, the base station determines a pre-coding matrix according to the RI value and the preset corresponding relationship of the pre-coding matrix indicator information with the two codebook indexes $i_1$ and $i_2$ in the source codebook.

Similarly, various corresponding relationships in the above conditions will not be enumerated; all the rules determined in line with the above corresponding relationship belong to the scope of the patent protection of the present invention.

It should be noted that, various corresponding relationships mentioned above refer to the description of the corresponding relationship to be applied depending on the RI value. In specific application scene, one or more of the above corresponding relationships can be optionally selected for combination; the adjustment on the technical schemes due to selection difference will not affect the scope of the patent protection of the present invention.

Compared with the present technology, the embodiments of the present invention possess the following advantages By applying the technical schemes of the embodiment of the present invention, in a LTE-A system using PUCCH reporting mode 1-1 submode 2 and PUCCH reporting mode 2-1, in a situation where PMI feedback for 8 antenna ports is needed to be reported in a sub-frame and PUCCH capacity is limited, therefore codebook compression, a corresponding relationship definition of the pre-coding matrix indicator information or the pre-coding matrix indicator information pair and the codebook index or the codebook index pair after code book compression is provided, thus realizing the feedback and receiving of channel state information between a base station and terminal equipment.

Figure 3:
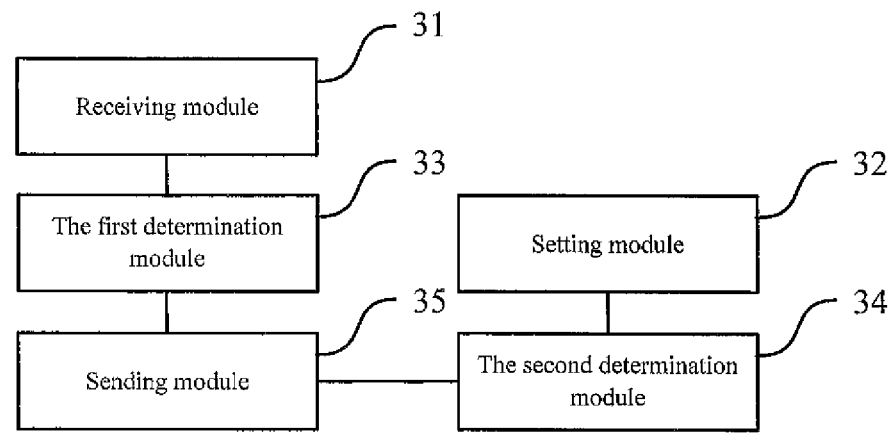
FIG. 3 is the structure diagram of the terminal equipment provided in the embodiment of the present invention.

In order to implement the technical schemes of the embodiments of the present invention, the embodiments of the present invention further put forward the terminal equipment; the structure diagram thereof is shown in FIG. 3, which specifically comprises:

A receiving module 31 for receiving the control signaling sent by base station, the control signaling informs the terminal equipment that channel state information feedback is needed and feedback mode to be used by the channel state information feedback;

A setting module 32 for setting a corresponding relationship of pre-coding matrix indicator information with the codebook index in the source codebook;

A determination module 33 for determining the RI value and pre-coding matrix in the compressed pre-coding matrix set and determining the value of the corresponding pre-coding matrix indicator information according to the RI value and the corresponding relationship of pre-coding matrix indicator information with the codebook index in the source codebook set by the setting module 32;

A sending module 34 for sending the RI value and the value of pre-coding matrix indicator information determined by the determination module 33 to the base station as per the feedback mode informed in the control signaling that receiving module 31 receives.

In specific application scene, the determination module 33 is used for:

determine the RI value and pre-coding matrix in the compressed pre-coding matrix set, and determining the value of the first pre-coding matrix indicator information and the second pre-coding matrix indicator information according to the RI value and the corresponding relationship of the first pre-coding matrix indicator information and the second pre-coding matrix indicator information with the two codebook indexes $i_1$ and $i_2$ in the source codebook set by the setting module 32 when the pre-coding matrix indicator information to be determined specifically comprises the first pre-coding matrix indicator information and the second pre-coding matrix indicator information; or, determine the RI value and pre-coding matrix in the compressed pre-coding matrix set, and determining the value of the pre-coding matrix indicator information according to the RI value and the corresponding relationship of the pre-coding matrix indicator information with the codebook index pair ($i_1$, $i_2$) composed of the two codebook indexes in the source codebook set by the setting module 32 when the pre-coding matrix indicator information to be determined specifically refers to a piece of pre-coding matrix indicator information; or, determine the RI value and pre-coding matrix in the compressed pre-coding matrix set, and determining the value of the first pre-coding matrix indicator information and the second pre-coding matrix indicator information according to the RI value and the corresponding relationship of the pre-coding matrix indicator information pair composed of the first pre-coding matrix indicator information and the second pre-coding matrix indicator information with the codebook index pair ($i_1$, $i_2$) composed of the two codebook indexes in the source codebook set by the setting module 32 when the pre-coding matrix indicator information to be determined specifically comprises the first pre-coding matrix indicator information and the second pre-coding matrix indicator information; or, determine the RI value and pre-coding matrix in the compressed pre-coding matrix set, and determining the value of the pre-coding matrix indicator information according to the RI value and the corresponding relationship of the pre-coding matrix indicator information with the two codebook indexes $i_1$ and $i_2$ in the source codebook set by the setting module 32 when the pre-coding matrix indicator information to be determined specifically refers to a piece of pre-coding matrix indicator information.

Figure 4:
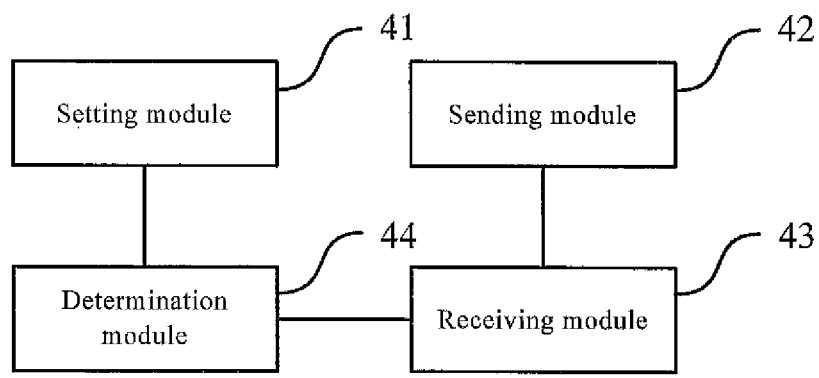
FIG. 4 is the structure diagram of the base station provided in the embodiment of the present invention.

Moreover, the embodiments of the present invention further provide the base station; the structure diagram thereof is shown in FIG. 4, which comprises:

A setting module 41 for setting a corresponding relationship of pre-coding matrix indicator information with the codebook index in the source codebook;

A sending module 42 for sending control signaling to terminal equipment to inform the terminal equipment that channel state information feedback is needed and feedback mode to be used by the channel state information feedback;

A receiving module 43 for receiving the RI value and the value of pre-coding matrix indicator information that terminal equipment reports as per the feedback mode that sending module 42 informs;

A determination module 44 for determining a pre-coding matrix as per the corresponding relationship of pre-coding matrix indicator information with the codebook index in the source codebook that setting module 41 sets according to the RI value and the value of pre-coding matrix indicator information that receiving module 43 receives.

In specific application scene, the determination module 44 is used for:

determine a pre-coding matrix according to the RI value and the corresponding relationship of the first pre-coding matrix indicator information and the second pre-coding matrix indicator information with the two codebook indexes $i_1$ and $i_2$ in the source codebook set by the setting module 41 when the pre-coding matrix indicator information reported by the terminal equipment that receiving module 43 receives specifically comprises the first pre-coding matrix indicator information and the second pre-coding matrix indicator information; or, determine a pre-coding matrix according to the RI value and the corresponding relationship of the pre-coding matrix indicator information with the codebook index pair ($i_1$, $i_2$) composed of the two codebook indexes in the source codebook set by the setting module 41 when the pre-coding matrix indicator information reported by the terminal equipment that receiving module 43 receives specifically refers to a piece of pre-coding matrix indicator information; or, determine a pre-coding matrix according to the RI value and the corresponding relationship of the pre-coding matrix indicator information pair composed of the first pre-coding matrix indicator information and the second pre-coding matrix indicator information with the codebook index pair ($i_1$, $i_2$) composed of the two codebook indexes in the source codebook set by the setting module 41 when the pre-coding matrix indicator information reported by the terminal equipment that receiving module 43 receives specifically comprises the pre-coding matrix indicator information pair composed of the first pre-coding matrix indicator information and the second pre-coding matrix indicator information; or, determine a pre-coding matrix according to the RI value and the corresponding relationship of the pre-coding matrix indicator information with the two codebook indexes $i_1$ and $i_2$ in the source codebook set by the setting module 41 when the pre-coding matrix indicator information reported by the terminal equipment that receiving module 43 receives specifically refers to a pre-coding matrix.

Compared with the present technology, the embodiments of the present invention possess the following advantages:

By applying the technical schemes of the embodiment of the present invention, in a LTE-A system using PUCCH reporting mode 1-1 submode 2 and PUCCH reporting mode 2-1 feedback mode, in a situation where PMI feedback for 8 antenna ports is needed to be reported in a sub-frame and PUCCH capacity is limited, therefore codebook compression, a corresponding relationship definition of the pre-coding matrix indicator information or the pre-coding matrix indicator information pair and the codebook index or the codebook index pair after code book compression is provided, thus realizing the feedback and receiving of channel state information between a base station and terminal equipment.

Through the description of the embodiments above, the technical personnel in this field can understand clearly that the embodiments of the present invention can be implemented by hardware or software and necessary general hardware platform. Based on this understanding, the technical program of the embodiments of the present invention can be embodied by a form of software products essentially which can be stored in a nonvolatile storage medium (such as CD-ROM, USB flash disk, mobile hard disk drive, etc.), including a number of instructions for making a computer device (such as personal computers, servers, or network equipments, etc.) implement the methods described in the embodiments of the present invention.

The technical personnel in this field can be understood that the illustration is only schematic drawings of a preferred embodiment, and the module or process is not necessary for the implementation of the embodiments of the present invention.

The technical personnel in this field can be understood that the modules can be distributed in device of the embodiments according to the description of the embodiments above, and also can be varied in one or multiply device of the embodiments. The modules of the embodiments can be combined into a module, and also can be further split into several sub-modules.

The number of the embodiments is only to describe, it does not represent the pros and cons of the embodiments.

The descriptions above are just preferred implements ways of the embodiments of the present invention. It should be pointed that, for general technical personnel in this field, some improvement and decorating can be done, which should be as the protection scope of the embodiments of the present invention.

The invention claimed is:

1. A method for transmitting channel state information, wherein, comprising:

receiving, by a terminal equipment, a control signaling sent by base station, the control signaling informs the terminal equipment that channel state information feedback is needed and feedback mode to be used by the channel state information feedback;

determining, by the terminal equipment, Rank Indication (RI) value and pre-coding matrix in compressed pre-coding matrix set and determining the value of corresponding pre-coding matrix indicator information according to preset corresponding relationship of the pre-coding matrix indicator information with codebook index in source codebook;

sending, by the terminal equipment, the determined RI value and the value of pre-coding matrix indicator information to the base station as per the feedback mode;

therein, determining, by the terminal equipment, Rank Indication (RI) value and pre-coding matrix in compressed pre-coding matrix set and determining the value of corresponding pre-coding matrix indicator information according to preset corresponding relationship of the pre-coding matrix indicator information with codebook index in source codebook, specifically comprises:

when the pre-coding matrix indicator information to be determined by the terminal equipment specifically comprises the first pre-coding matrix indicator information and the second pre-coding matrix indicator information, the terminal equipment determines the value of the first pre-coding matrix indicator information and the second pre-coding matrix indicator information according to the RI value and preset corresponding relationship of the first pre-coding matrix indicator information and the second pre-coding matrix indicator information with the two codebook indexes $i_1$ and $i_2$ in the source codebook; or, when the pre-coding matrix indicator information to be determined by the terminal equipment specifically refers to a piece of pre-coding matrix indicator information, the terminal equipment determines the value of the pre-coding matrix indicator information according to the RI value and the preset corresponding relationship of the pre-coding matrix indicator information with the codebook index pair ($i_1$, $i_2$) composed of the two codebook indexes in the source codebook; or, when the pre-coding matrix indicator information to be determined by the terminal equipment specifically comprises the first pre-coding matrix indicator information and the second pre-coding matrix indicator information, the terminal equipment determines the value of the first pre-coding matrix indicator information and the second pre-coding matrix indicator information according to the RI value and the preset corresponding relationship of the pre-coding matrix indicator information pair composed of the first pre-coding matrix indicator information and the second pre-coding matrix indicator information with the codebook index pair ($i_1$, $i_2$) composed of the two codebook indexes in the source codebook; or, when the pre-coding matrix indicator information to be determined by the terminal equipment specifically refers to a piece of pre-coding matrix indicator information, the terminal equipment determines the value of the pre-coding matrix indicator information according to the RI value and the preset corresponding relationship of the pre-coding matrix indicator information with the two codebook indexes $i_1$ and $i_2$ in the source codebook.

2. The method of claim 1, wherein, when the RI value that terminal equipment determines is 1, the preset corresponding relationship of the first pre-coding matrix indicator information and the second pre-coding matrix indicator information with the two codebook indexes $i_1$ and $i_2$ in the source codebook, which used by the terminal equipment to determine the value of the first pre-coding matrix indicator information and the second pre-coding matrix indicator information, specifically comprises:

the value of the first pre-coding matrix indicator information $i_1 \in \{0, 1, \ldots, 7\}$ corresponds to the codebook index $\lfloor i_1/2 \rfloor$ in the Rank 1 source codebook, and the value of the second pre-coding matrix indicator information $i_2 \in \{0, 1, \ldots, 15\}$ corresponds to the codebook index $i_2$ in the Rank 1 source codebook; or, the value of the first pre-coding matrix indicator information $i_1 \in \{0, 1, \ldots, 7\}$ corresponds to the codebook index $2i_1$ in the Rank 1 source codebook, and the value of the second pre-coding matrix indicator information $i_2 \in \{0, 1, \ldots, 15\}$ corresponds to the codebook index $i_2$ in the Rank 1 source codebook; or, the value of the first pre-coding matrix indicator information $i_1 \in \{0, 1, \ldots, 15\}$ corresponds to the codebook index $i_1$ in the Rank 1 source codebook, and the value of the second pre-coding matrix indicator information $i_2 \in \{0, 1, \ldots, 7\}$ corresponds to the codebook index $i_2$ in the Rank 1 source codebook; or, the value of the first pre-coding matrix indicator information $i_1 \in \{0, 1, \ldots, 15\}$ corresponds to the codebook index $i_1$ in the Rank 1 source codebook, when the value of the second pre-coding matrix indicator information is $i_2 \in \{0, 1, 2, 3\}$, the value of the second pre-coding matrix indicator information corresponds to the codebook index $i_2$ in the Rank 1 source codebook and when the value of the second pre-coding matrix indicator information is $i_2 \in \{4, 5, 6, 7\}$, the value of the second pre-coding matrix indicator information corresponds to codebook index $i_2+8$ in the Rank 1 source codebook; or, the value of the first pre-coding matrix indicator information $i_1 \in \{0, 1, \ldots, 15\}$ corresponds to the codebook index $i_1$ in the Rank 1 source codebook, and the value of the second pre-coding matrix indicator information $i_2 \in \{0, 1, \ldots, 7\}$ corresponds to the codebook index $i_2+4$ in the Rank 1 source codebook; or, the value of the first pre-coding matrix indicator information $i_1 \in \{0, 1, \ldots, 15\}$ corresponds to the codebook index $i_1$ in the Rank 1 source codebook, and the value of the second pre-coding matrix indicator information $i_2 \in \{0, 1, \ldots, 7\}$ corresponds to the codebook index $i_2+8$ in the Rank 1 source codebook; or, the value of the first pre-coding matrix indicator information $i_1 \in \{0, 1, \ldots, 7\}$ corresponds to the codebook index $\lfloor i_1/2 \rfloor$ in the Rank 1 source codebook, and the value of the second pre-coding matrix indicator information $i_2 \in \{0,1\}$ corresponds to the codebook index $2i_2$ in the Rank 1 source codebook; or, the value of the first pre-coding matrix indicator information $i_1 \in \{0, 1, \ldots, 7\}$ corresponds to the codebook index $2i_1$ in the Rank 1 source codebook, and the value of the second pre-coding matrix indicator information $i_2 \in \{0,1\}$ corresponds to the codebook index $2i_2$ in the Rank 1 source codebook; or, the value of the first pre-coding matrix indicator information $i_1 \in \{0, 1, \ldots, 7\}$ corresponds to the codebook index $\lfloor i_1/2 \rfloor$ in the Rank 1 source codebook, and the value of the second pre-coding matrix indicator information $i_2 \in \{0,1\}$ corresponds to the codebook index $2i_2+4$ in the Rank 1 source codebook; or, the value of the first pre-coding matrix indicator information $i_1 \in \{0, 1, \ldots, 7\}$ corresponds to the codebook index $2i_1$ in the Rank 1 source codebook, and the value of the second pre-coding matrix indicator information $i_2 \in \{0, 1\}$ corresponds to the codebook index $2i_2+4$ in the Rank 1 source codebook; or, the value of the first pre-coding matrix indicator information $i_1 \in \{0, 1, \ldots, 7\}$ corresponds to the codebook index $\lfloor i_1/2 \rfloor$ in the Rank 1 source codebook, and the value of the second pre-coding matrix indicator information $i_2 \in \{0,1\}$ corresponds to the codebook index $2i_2+8$ in the Rank 1 source codebook; or, the value of the first pre-coding matrix indicator information $i_1 \in \{0, 1, \ldots, 7\}$ corresponds to the codebook index $2i_1$ in the Rank 1 source codebook, and the value of the second pre-coding matrix indicator information $i_2 \in \{0, 1\}$ corresponds to the codebook index $2i_2+8$ in the Rank 1 source codebook; or, the value of the first pre-coding matrix indicator information $i_1 \in \{0, 1, \ldots, 7\}$ corresponds to the codebook index $\lfloor i_1/2 \rfloor$ in the Rank 1 source codebook, and the value of the second pre-coding matrix indicator information $i_2 \in \{0,1\}$ corresponds to the codebook index $2i_2+12$ in the Rank 1 source codebook; or, the value of the first pre-coding matrix indicator information $i_1 \in \{0, 1, \ldots, 7\}$ corresponds to the codebook index $2i_1$ in the Rank 1 source codebook, and the value of the second pre-coding matrix indicator information $i_2 \in \{0, 1\}$ corresponds to the codebook index $2i_2+12$ in the Rank 1 source codebook; or, the value of the first pre-coding matrix indicator information $i_1 \in \{0, 1, \ldots, 7\}$ corresponds to the codebook index $\lfloor i_1/2 \rfloor$ in the Rank 1 source codebook, when the value of the second pre-coding matrix indicator information is $i_2 \in \{0,1\}$ the value of the second pre-coding matrix indicator information corresponds to the codebook index $2i_2$ in the Rank 1 source codebook, and when the value of the second pre-coding matrix indicator information is $i_2 \in \{3,4\}$ the value of the second pre-coding matrix indicator information corresponds to the codebook index $2i_2+5$ in the Rank 1 source codebook; or, the value of the first pre-coding matrix indicator information $i_1 \in \{0, 1, \ldots, 7\}$ corresponds to the codebook index $2i_1$ in the Rank 1 source codebook, when the value of the second pre-coding matrix indicator information is $i_2 \in \{0, 1\}$, the value of the second pre-coding matrix indicator information corresponds to the codebook index $2i_2$ in the Rank 1 source codebook, and when the value of the second pre-coding matrix indicator information is $i_2 \in \{3, 4\}$, the value of the second pre-coding matrix indicator information corresponds to the codebook index $2i_2+5$ in the Rank 1 source codebook; or, the value of the first pre-coding matrix indicator information $i_1 \in \{0, 1, \ldots, 15\}$ corresponds to the codebook index $i_1$ in the Rank 1 source codebook, and the value of the second pre-coding matrix indicator information $i_2 \in \{0, 1\}$ corresponds to the codebook index $2i_2$ in the Rank 1 source codebook; or, the value of the first pre-coding matrix indicator information $i_1 \in \{0, 1, \ldots, 15\}$ corresponds to the codebook index $i_1$ in the Rank 1 source codebook, and the value of the second pre-coding matrix indicator information $i_2 \in \{0, 1\}$ corresponds to the codebook index $8+2i_2$ in the Rank 1 source codebook; or, the value of the first pre-coding matrix indicator information $i_1 \in \{0, 1, \ldots, 7\}$ corresponds to the codebook index $\lfloor i_1/2 \rfloor$ in the Rank 1 source codebook, when the value of the second pre-coding matrix indicator information is $i_2 \in \{0,1\}$, the value of the second pre-coding matrix indicator information corresponds to the codebook index $2i_2$ in the Rank 1 source codebook, and when the value of the second pre-coding matrix indicator information is $i_2 \in \{2,3\}$, the value of the second pre-coding matrix indicator information corresponds to the codebook index $8+2i_2$ in the Rank 1 source codebook; or, the value of the first pre-coding matrix indicator information $i_1 \in \{0, 1, \ldots, 7\}$ corresponds to the codebook index $2i_1$ in the Rank 1 source codebook, when the value of the second pre-coding matrix indicator information is $i_2 \in \{0, 1\}$, the value of the second pre-coding matrix indicator information corresponds to the codebook index $2i_2$ in the Rank 1 source codebook, and when the value of the second pre-coding matrix indicator information is $i_2 \in \{2, 3\}$, the value of the second pre-coding matrix indicator information corresponds to the codebook index $8+2i_2$ in the Rank 1 source codebook; or, the value of the first pre-coding matrix indicator information $i_1 \in \{0, 1, \ldots, 7\}$ corresponds to the codebook index $\lfloor i_1/2 \rfloor$ in the Rank 1 source codebook, and the value of the second pre-coding matrix indicator information $i_2 \in \{0,1\}$ corresponds to the codebook index $8i_2$ in the Rank 1 source codebook; or, the value of the first pre-coding matrix indicator information $i_1 \in \{0, 1, \ldots, 7\}$ corresponds to the codebook index $2i_1$ in the Rank 1 source codebook, and the value of the second pre-coding matrix indicator information $i_2 \in \{0, 1\}$ corresponds to the codebook index $8i_2$ in the Rank 1 source codebook; or, the value of the first pre-coding matrix indicator information $i_1 \in \{0, 1, \ldots, 15\}$ corresponds to the codebook index $i_1$ in the Rank 1 source codebook, and the value of the second pre-coding matrix indicator information $i_2=0$ corresponds to the codebook index $i_2=0$ in the Rank 1 source codebook;

therein, $\lfloor x \rfloor$ represents the greatest integer no greater than x.

3. The method of claim 1, wherein, when the RI value that terminal equipment determines is 2, the preset corresponding relationship of the first pre-coding matrix indicator information and the second pre-coding matrix indicator information with the two codebook indexes $i_1$ and $i_2$ in the source codebook, which used by the terminal equipment to determine the value of the first pre-coding matrix indicator information and the second pre-coding matrix indicator information, specifically comprises:

the value of the first pre-coding matrix indicator information $i_1 \in \{0, 1, \ldots, 7\}$ corresponds to the codebook index $\lfloor i_1/2 \rfloor$ in the Rank 2 source codebook, and the value of the second pre-coding matrix indicator information $i_2 \in \{0,1\}$ corresponds to the codebook index $i_2$ in the Rank 2 source codebook; or, the value of the first pre-coding matrix indicator information $i_1 \in \{0, 1, \ldots, 7\}$ corresponds to the codebook index $2i_1$ in the Rank 2 source codebook, and the value of the second pre-coding matrix indicator information $i_2 \in \{0, 1\}$ corresponds to the codebook index $i_2$ in the Rank 2 source codebook; or, the value of the first pre-coding matrix indicator information $i_1 \in \{0, 1, \ldots, 7\}$ corresponds to the codebook index $\lfloor i_1/2 \rfloor$ in the Rank 2 source codebook, and the value of the second pre-coding matrix indicator information $i_2 \in \{0,1\}$ corresponds to the codebook index $4+i_2$ in the Rank 2 source codebook; or, the value of the first pre-coding matrix indicator information $i_1 \in \{0, 1, \ldots, 7\}$ corresponds to the codebook index $2i_1$ in the Rank 2 source codebook, and the value of the second pre-coding matrix indicator information $i_2 \in \{0, 1\}$ corresponds to the codebook index $4+i_2$ in the Rank 2 source codebook; or, the value of the first pre-coding matrix indicator information $i_1 \in \{0, 1, \ldots, 7\}$ corresponds to the codebook index $\lfloor i_1/2 \rfloor$ in the Rank 2 source codebook, and the value of the second pre-coding matrix indicator information $i_2 \in \{0,1\}$ corresponds to the codebook index $4i_2$ in the Rank 2 source codebook; or, the value of the first pre-coding matrix indicator information $i_1 \in \{0, 1, \ldots, 7\}$ corresponds to the codebook index $2i_1$ in the Rank 2 source codebook, and the value of the second pre-coding matrix indicator information $i_2 \in \{0, 1\}$ corresponds to the codebook index $4i_2$ in the Rank 2 source codebook; or, the value of the first pre-coding matrix indicator information $i_1 \in \{0, 1, \ldots, 15\}$ corresponds to the codebook index $i_1$ in the Rank 2 source codebook, and the value of the second pre-coding matrix indicator information $i_2=0$ corresponds to the codebook index $i_2=0$ in the Rank 2 source codebook; or, the value of the first pre-coding matrix indicator information $i_1 \in \{0, 1, \ldots, 15\}$ corresponds to the codebook index $i_1$ in the Rank 2 source codebook, and the value of the second pre-coding matrix indicator information $i_2=0$ corresponds to the codebook index $i_2=4$ in the Rank 2 source codebook; or, the value of the first pre-coding matrix indicator information $i_1 \in \{0, 1, \ldots, 15\}$ corresponds to the codebook index $i_1$ in the Rank 2 source codebook, and the value of the second pre-coding matrix indicator information $i_2 \in \{0, 1, 2, 3\}$ corresponds to the codebook index $2i_2$ in the Rank 2 source codebook; or, the value of the first pre-coding matrix indicator information $i_1 \in \{0, 1, \ldots, 7\}$ corresponds to the codebook index $\lfloor i_1/2 \rfloor$ in the Rank 2 source codebook, and the value of the second pre-coding matrix indicator information $i_2 \in \{0,1\}$ corresponds to the codebook index $5i_2$ in the Rank 2 source codebook; or, the value of the first pre-coding matrix indicator information $i_1 \in \{0, 1, \ldots, 7\}$ corresponds to the codebook index $2i_1$ in the Rank 2 source codebook, and the value of the second pre-coding matrix indicator information $i_2 \in \{0, 1\}$ corresponds to the codebook index $5i_2$ in the Rank 2 source codebook;

therein, $\lfloor x \rfloor$ represents the greatest integer no greater than x.

4. The method of claim 1, wherein, when the RI value that terminal equipment determines is 3, the preset corresponding relationship of the first pre-coding matrix indicator information and the second pre-coding matrix indicator information with the two codebook indexes $i_1$ and $i_2$ in the source codebook, which used by the terminal equipment to determine the value of the first pre-coding matrix indicator information and the second pre-coding matrix indicator information, specifically comprises:

the value of the first pre-coding matrix indicator information $i_1 \in \{0, 1, 2, 3\}$ corresponds to the codebook index $i_1$ in the Rank 3 source codebook, and the value of the second pre-coding matrix indicator information $i_2 \in \{0,1,2,3\}$ corresponds to the codebook index $4i_2$ in the Rank 3 source codebook; or, the value of the first pre-coding matrix indicator information $i_1 \in \{0,1,2,3\}$ corresponds to the codebook index $i_1$ in the Rank 3 source codebook, and the value of the second pre-coding matrix indicator information $i_2 \in \{0,1,2,3\}$ corresponds to the codebook index $4i_2+1$ in the Rank 3 source codebook; or, the value of the first pre-coding matrix indicator information $i_1 \in \{0,1,2,3\}$ corresponds to the codebook index $i_1$ in the Rank 3 source codebook, and the value of the second pre-coding matrix indicator information $i_2 \in \{0,1,2,3\}$ corresponds to the codebook index $4i_2+2$ in the Rank 3 source codebook; or, the value of the first pre-coding matrix indicator information $i_1 \in \{0,1,2,3\}$ corresponds to the codebook index $i_1$ in the Rank 3 source codebook, and the value of the second pre-coding matrix indicator information $i_2 \in \{0,1,2,3\}$ corresponds to the codebook index $4i_2+3$ in the Rank 3 source codebook; or, the value of the first pre-coding matrix indicator information $i_1 \in \{0,1\}$ corresponds to the codebook index $\lfloor i_1/2 \rfloor$ in the Rank 3 source codebook, and the value of the second pre-coding matrix indicator information $i_2 \in \{0,1,\ldots,7\}$ corresponds to the codebook index $4 \cdot \lfloor i_2/2 \rfloor + (i_2 \bmod 2)$ in the Rank 3 source codebook; or, the value of the first pre-coding matrix indicator information $i_1 \in \{0,1\}$ an corresponds to the codebook index $2i_1$ in the Rank 3 source codebook, and the value of the second pre-coding matrix indicator information $i_2 \in \{0,1,\ldots,7\}$ corresponds to the codebook index $4 \cdot \lfloor i_2/2 \rfloor + (i_2 \bmod 2)$ in the Rank 3 source codebook; or, the value of the first pre-coding matrix indicator information $i_1 \in \{0,1\}$ corresponds to the codebook index $\lfloor i_1/2 \rfloor$ in the Rank 3 source codebook, and the value of the second pre-coding matrix indicator information $i_2 \in \{0,1,\ldots,7\}$ corresponds to the codebook index $2i_2$ in the Rank 3 source codebook; or, the value of the first pre-coding matrix indicator information $i_1 \in \{0,1\}$ corresponds to the codebook index $2i_1$ in the Rank 3 source codebook, and the value of the second pre-coding matrix indicator information $i_2 \in \{0,1,\ldots,7\}$ corresponds to the codebook index $2i_2$ in the Rank 3 source codebook; or, the value of the first pre-coding matrix indicator information $i_1 \in \{0,1\}$ corresponds to the codebook index $\lfloor i_1/2 \rfloor$ in the Rank 3 source codebook, and the value of the second pre-coding matrix indicator information $i_2 \in \{0,1,\ldots,7\}$ corresponds to the codebook index $4 \cdot \lfloor i_2/2 \rfloor + 3 \cdot (i_2 \bmod 2)$ in the Rank 3 source codebook; or, the value of the first pre-coding matrix indicator information $i_1 \in \{0,1\}$ corresponds to the codebook index $2i_1$ in the Rank 3 source codebook, and the value of the second pre-coding matrix indicator information $i_2 \in \{0,1,\ldots,7\}$ corresponds to the codebook index $4 \cdot \lfloor i_2/2 \rfloor + 3 \cdot (i_2 \bmod 2)$ in the Rank 3 source codebook; or, the value of the first pre-coding matrix indicator information $i_1 \in \{0,1\}$ corresponds to the codebook index $\lfloor i_1/2 \rfloor$ in the Rank 3 source codebook, and the value of the second pre-coding matrix indicator information $i_2 \in \{0,1,\ldots,7\}$ corresponds to the codebook index $2i_2+1$ in the Rank 3 source codebook; or, the value of the first pre-coding matrix indicator information $i_1 \in \{0,1\}$ corresponds to the codebook index $2i_1$ in the Rank 3 source codebook, and the value of the second pre-coding matrix indicator information $i_2 \in \{0,1,\ldots,7\}$ corresponds to the codebook index $2i_2+1$ in the Rank 3 source codebook; or, the value of the first pre-coding matrix indicator information $i_1 \in \{0,1\}$ corresponds to the codebook index $\lfloor i_1/2 \rfloor$ in the Rank 3 source codebook, and the value of the second pre-coding matrix indicator information $i_2 \in \{0,1,\ldots,7\}$ corresponds to the codebook index $8\lfloor i_2/4 \rfloor + i_2$ in the Rank 3 source codebook; or, the value of the first pre-coding matrix indicator information $i_1 \in \{0,1\}$ corresponds to the codebook index $2i_1$ in the Rank 3 source codebook, and the value of the second pre-coding matrix indicator information $i_2 \in \{0,1,\ldots,7\}$ corresponds to the codebook index $4\lfloor i_2/4 \rfloor + i_2$ in the Rank 3 source codebook; or, the value of the first pre-coding matrix indicator information $i_1 \in \{0,1,2,3\}$ corresponds to the codebook index $i_1$ in the Rank 3 source codebook, and the value of the second pre-coding matrix indicator information $i_2 \in \{0,1,2,3\}$ corresponds to the codebook index $i_2$ in the Rank 3 source codebook; or, the value of the first pre-coding matrix indicator information corresponds to the codebook index $i_1$ in the Rank 3 source codebook, and the value of the second pre-coding matrix indicator information $i_2 \in \{0,1,2,3\}$ corresponds to the codebook index $i_2+4$ in the Rank 3 source codebook; or, the value of the first pre-coding matrix indicator information $i_1 \in \{0,1,2,3\}$ corresponds to the codebook index $i_1$ in the Rank 3 source codebook, and the value of the second pre-coding matrix indicator information $i_2 \in \{0,1,2,3\}$ corresponds to the codebook index $i_2+8$ in the Rank 3 source codebook; or, the value of the first pre-coding matrix indicator information $i_1 \in \{0,1,2,3\}$ corresponds to the codebook index $i_1$ in the Rank 3 source codebook, and the value of the second pre-coding matrix indicator information $i_2 \in \{0,1,2,3\}$ corresponds to the codebook index $i_2+12$ in the Rank 3 source codebook; or, the value of the first pre-coding matrix indicator information $i_1 \in \{0,1,2,3\}$ corresponds to the codebook index $i_1$ in the Rank 3 source codebook, and the value of the second pre-coding matrix indicator information $i_2 \in \{0,1,2,3\}$ corresponds to the codebook index $8 \cdot \lfloor i_2/2 \rfloor + (i_2 \bmod 2)$ in the Rank 3 source codebook; or, the value of the first pre-coding matrix indicator information $i_1 \in \{0,1,2,3\}$ corresponds to the codebook index $i_1$ in the Rank 3 source codebook, and the value of the second pre-coding matrix indicator information $i_2 \in \{0,1,2,3\}$ corresponds to the codebook index $8 \cdot \lfloor i_2/2 \rfloor + (i_2 \bmod 2) + 2$ in the Rank 3 source codebook;

therein, $\lfloor x \rfloor$ represents the greatest integer no greater than x and i mod 2 represents the remainder of dividing i by 2.

5. The method according claim 1, wherein, when the RI value that terminal equipment determines is 4, the preset corresponding relationship of the first pre-coding matrix indicator information and the second pre-coding matrix indicator information with the two codebook indexes $i_1$ and $i_2$ in the source codebook, which used by the terminal equipment to determine the value of the first pre-coding matrix indicator information and the second pre-coding matrix indicator information, specifically comprises:

the value of the first pre-coding matrix indicator information $i_1 \in \{0,1,2,3\}$ corresponds to the codebook index $i_1$ in the Rank 4 source codebook, and the value of the second pre-coding matrix indicator information $i_2 \in \{0,1,2,3\}$ corresponds to the codebook index $2i_2$ in the Rank 4 source codebook; or, the value of the first pre-coding matrix indicator information $i_1 \in \{0,1,2,3\}$ corresponds to the codebook index $i_1$ in the Rank 4 source codebook, and the value of the second pre-coding matrix indicator information $i_2 \in \{0,1,2,3\}$ corresponds to the codebook index $4 \cdot \lfloor i_2/2 \rfloor + 3(i_2 \bmod 2)$ the Rank 4 source codebook; or, the value of the first pre-coding matrix indicator information $i_1 \in \{0,1,2,3\}$ corresponds to the codebook index $i_1$ in the Rank 4 source codebook, and the value of the second pre-coding matrix indicator information $i_2 \in \{0,1,2,3\}$ corresponds to the codebook index $2+i_2$ in the Rank 4 source codebook; or, the value of the first pre-coding matrix indicator information $i_1 \in \{0,1\}$ corresponds to the codebook index $\lfloor i_1/2 \rfloor$ in the Rank 4 source codebook, and the value of the second pre-coding matrix indicator information $i_2 \in \{0, 1, \ldots, 7\}$ corresponds to the codebook index $i_2$ in the Rank 4 source codebook; or, the value of the first pre-coding matrix indicator information $i_1 \in \{0,1\}$ corresponds to the codebook index $2i_1$ in the Rank 4 source codebook, and the value of the second pre-coding matrix indicator information $i_2 \in \{0, 1, \ldots, 7\}$ corresponds to the codebook index $i_2$ in the Rank 4 source codebook;

therein, $\lfloor x \rfloor$ represents the greatest integer no greater than x and i mod 2 represents the remainder of dividing i by 2.

6. The method of claim 1, wherein, when the RI value that terminal equipment determines is 1, the preset corresponding relationship of the first pre-coding matrix indicator information and the second pre-coding matrix indicator information with the two codebook indexes $i_1$ and $i_2$ in the source codebook, which used by the terminal equipment to determine the value of the pre-coding matrix indicator information, specifically comprises:

the value of the pre-coding matrix indicator information $i \in \{0, 1, \ldots, 15\}$ corresponds to the codebook index pair $(i_1, i_2)$ in the Rank 1 source codebook, therein, $i_1 = i$ and $i_2 = 2 \cdot (i \bmod 2)$; or, the value of the pre-coding matrix indicator information $i \in \{0, 1, \ldots, 15\}$ corresponds to the codebook index pair $(i_1, i_2)$ in the Rank 1 source codebook, therein, $i_1 = i$ and $i_2 = 8 + 2 \cdot (i \bmod 2)$; or, the value of the pre-coding matrix indicator information $i \in \{0, 1, \ldots, 15\}$ corresponds to the codebook index pair $(i_1, i_2)$ in the Rank 1 source codebook, therein, $i_1 = i$ and $i_2 = i \bmod 4$; or, the value of the pre-coding matrix indicator information $i \in \{0, 1, \ldots, 15\}$ corresponds to the codebook index pair $(i_1, i_2)$ in the Rank 1 source codebook, therein, $i_1 = i$ and $i_2 = 8 + 2 \cdot (i \bmod 4)$;

therein, i mod 2 represents the remainder of dividing i by 2 and i mod 4 represents the remainder of dividing i by 4.

7. The method of claim 1, wherein, the source codebook, specifically refers to:

codebook for 8 antenna ports in LTE-A system.

8. A terminal equipment, wherein, comprising:

a receiving module, used to receive control signaling sent by base station, the control signaling informs the terminal equipment that channel state information feedback is needed and feedback mode to be used by the channel state information feedback;

a setting module, used to set a corresponding relationship of pre-coding matrix indicator information with codebook index in the source codebook;

a determination module, used to determine the RI value and pre-coding matrix in compressed pre-coding matrix set and determining the value of the corresponding pre-coding matrix indicator information according to the RI value and the corresponding relationship of the pre-coding matrix indicator information with the codebook index in the source codebook set by the setting module;

a sending module, used to send the RI value and the value of pre-coding matrix indicator information determined by the determination module to the base station as per the feedback mode informed in the control signaling that receiving module receives;

therein, the determination module, specifically used to:

determine the RI value and pre-coding matrix in the compressed pre-coding matrix set, and determining the value of the first pre-coding matrix indicator information and the second pre-coding matrix indicator information according to the RI value and the corresponding relationship of the first pre-coding matrix indicator information and the second pre-coding matrix indicator information with the two codebook indexes $i_1$ and $i_2$ in the source codebook set by the setting module when the pre-coding matrix indicator information to be determined specifically comprises the first pre-coding matrix indicator information and the second pre-coding matrix indicator information; or, determine the RI value and pre-coding matrix in the compressed pre-coding matrix set, and determining the value of the pre-coding matrix indicator information according to the RI value and the corresponding relationship of the pre-coding matrix indicator information with the codebook index pair $(i_1, i_2)$ composed of the two codebook indexes in the source codebook set by the setting module when the pre-coding matrix indicator information to be determined specifically refers to a piece of pre-coding matrix indicator information; or, determine the RI value and pre-coding matrix in the compressed pre-coding matrix set, and determining the value of the first pre-coding matrix indicator information and the second pre-coding matrix indicator information according to the RI value and the corresponding relationship of the pre-coding matrix indicator information pair composed of the first pre-coding matrix indicator information and the second pre-coding matrix indicator information with the codebook index pair $(i_1, i_2)$ composed of the two codebook indexes in the source codebook set by the setting module when the pre-coding matrix indicator information to be determined specifically comprises the first pre-coding matrix indicator information and the second pre-coding matrix indicator information; or, determine the RI value and pre-coding matrix in the compressed pre-coding matrix set, and determining the value of the pre-coding matrix indicator information according to the RI value and the corresponding relationship of the pre-coding matrix indicator information with the two codebook indexes $i_1$ and $i_2$ in the source codebook set by the setting module when the pre-coding matrix indicator information to be determined specifically refers to a piece of pre-coding matrix indicator information.

9. A method for transmitting channel state information, wherein, comprising:

sending, by a base station, a control signaling to terminal equipment to inform the terminal equipment that channel state information feedback is needed and feedback mode to be used by the channel state information feedback;

receiving, by the base station, RI and pre-coding matrix indicator information that the terminal equipment reports as per the feedback mode;

determining, by the base station, a pre-coding matrix according to preset corresponding relationship of pre-coding matrix indicator information with codebook index in source codebook according to the received RI value and value of the pre-coding matrix indicator information, wherein, determining, by the base station, a pre-coding matrix according to preset corresponding relationship of pre-coding matrix indicator information with codebook index in source codebook according to the received RI value and value of the pre-coding matrix indicator information, specifically comprises:

when the pre-coding matrix indicator information reported by the terminal equipment that base station receives specifically comprises the first pre-coding matrix indicator information and the second pre-coding matrix indicator information, the base station determines a pre-coding matrix according to the RI value and the preset corresponding relationship of the first pre-coding matrix indicator information and the second pre-coding matrix indicator information with the two codebook indexes $i_1$ and $i_2$ in the source codebook; or, when the pre-coding matrix indicator information reported by the terminal equipment that base station receives specifically refers to a piece of pre-coding matrix indicator information, the base station determines a pre-coding matrix according to the RI value and the preset corresponding relationship of the pre-coding matrix indicator information with the codebook index pair ($i_1$, $i_2$) composed of the two codebook indexes in the source codebook; or, when the pre-coding matrix indicator information reported by the terminal equipment that base station receives specifically comprises a pre-coding matrix indicator information pair composed of the first pre-coding matrix indicator information and the second pre-coding matrix indicator information, the base station determines a pre-coding matrix according to the RI value and the preset corresponding relationship of the pre-coding matrix indicator information pair composed of the first pre-coding matrix indicator information and the second pre-coding matrix indicator information with the codebook index pair ($i_1$, $i_2$) composed of the two codebook indexes in the source codebook; or, when the pre-coding matrix indicator information reported by the terminal equipment that base station receives specifically refers to a pre-coding matrix, the base station determines a pre-coding matrix according to the RI value and the preset corresponding relationship of the pre-coding matrix indicator information with the two codebook indexes $i_1$ and $i_2$ in the source codebook.

10. The method of claim 9, wherein, when the RI value reported by the terminal equipment that base station receives is 1, the preset corresponding relationship of the first pre-coding matrix indicator information and the second pre-coding matrix indicator information with the two codebook indexes $i_1$ and $i_2$ in the source codebook, which is used by the base station to determine the pre-coding matrix, specifically comprises:

the value of the first pre-coding matrix indicator information $i_1 \in \{0, 1, \ldots, 7\}$ corresponds to the codebook index $\lfloor i_1/2 \rfloor$ in the Rank 1 source codebook, and the value of the second pre-coding matrix indicator information $i_2 \in \{0, 1, \ldots, 15\}$ corresponds to the codebook index $i_2$ in the Rank 1 source codebook; or, the value of the first pre-coding matrix indicator information $i_1 \in \{0, 1, \ldots, 7\}$ corresponds to the codebook index $2i_1$ in the Rank 1 source codebook, and the value of the second pre-coding matrix indicator information $i_2 \in \{0, 1, \ldots, 15\}$ corresponds to the codebook index $i_2$ in the Rank 1 source codebook; or, the value of the first pre-coding matrix indicator information $i_1 \in \{0, 1, \ldots, 15\}$ corresponds to the codebook index $i_1$ in the Rank 1 source codebook, and the value of the second pre-coding matrix indicator information $i_2 \in \{0, 1, \ldots, 7\}$ corresponds to the codebook index $i_2$ in the Rank 1 source codebook; or, the value of the first pre-coding matrix indicator information $i_1 \in \{0, 1, \ldots, 15\}$ corresponds to the codebook index $i_1$ in the Rank 1 source codebook, when the value of the second pre-coding matrix indicator information is $i_2 \in \{0, 1, 2, 3\}$, the value of the second pre-coding matrix indicator information corresponds to the codebook index $i_2$ in the Rank 1 source codebook, and when the value of the second pre-coding matrix indicator information is $i_2 \in \{4,5,6,7\}$, the value of the second pre-coding matrix indicator information corresponds to the codebook index $i_2+8$ in the Rank 1 source codebook; or, the value of the first pre-coding matrix indicator information $i_1 \in \{0, 1, \ldots, 15\}$ corresponds to the codebook index $i_1$ in the Rank 1 source codebook, and the value of the second pre-coding matrix indicator information $i_2 \in \{0, 1, \ldots, 7\}$ corresponds to the codebook index $i_{2+4}$ in the Rank 1 source codebook; or, the value of the first pre-coding matrix indicator information $i_1 \in \{0, 1, \ldots, 15\}$ corresponds to the codebook index $i_1$ in the Rank 1 source codebook, and the value of the second pre-coding matrix indicator information $i_2 \in \{0, 1, \ldots, 7\}$ corresponds to the codebook index $i_2+8$ in the Rank 1 source codebook; or, the value of the first pre-coding matrix indicator information $i_1 \in \{0, 1, \ldots, 7\}$ corresponds to the codebook index $\lfloor i_1/2 \rfloor$ in the Rank 1 source codebook, and the value of the second pre-coding matrix indicator information $i_2 \in \{0,1\}$ corresponds to the codebook index $2i_2$ in the Rank 1 source codebook; or, the value of the first pre-coding matrix indicator information $i_1 \in \{0, 1, \ldots, 7\}$ corresponds to the codebook index $2i_1$ in the Rank 1 source codebook, and the value of the second pre-coding matrix indicator information $i_2 \in \{0, 1\}$ corresponds to the codebook index $2i_2$ in the Rank 1 source codebook; or, the value of the first pre-coding matrix indicator information $i_1 \in \{0, 1, \ldots, 7\}$ corresponds to the codebook index $\lfloor i_1/2 \rfloor$ in the Rank 1 source codebook, and the value of the second pre-coding matrix indicator information $i_2 \in \{0,1\}$ corresponds to the codebook index $2i_2+4$ in the Rank 1 source codebook; or, the value of the first pre-coding matrix indicator information $i_1 \in \{0, 1, \ldots, 7\}$ corresponds to the codebook index $2i_1$ in the Rank 1 source codebook, and the value of the second pre-coding matrix indicator information $i_2 \in \{0, 1\}$ corresponds to the codebook index $2i_2+4$ in the Rank 1 source codebook; or, the value of the first pre-coding matrix indicator information $i_1 \in \{0, 1, \ldots, 7\}$ corresponds to the codebook index $\lfloor i_1/2 \rfloor$ in the Rank 1 source codebook, and the value of the second pre-coding matrix indicator information $i_2 \in \{0,1\}$ corresponds to the codebook index $2i_2+8$ in the Rank 1 source codebook; or, the value of the first pre-coding matrix indicator information $i_1 \in \{0, 1, \ldots, 7\}$ corresponds to the codebook index $2i_1$ in the Rank 1 source codebook, and the value of the second pre-coding matrix indicator information $i_2 \in \{0, 1\}$ corresponds to the codebook index $2i_2+8$ in the Rank 1 source codebook; or, the value of the first pre-coding matrix indicator information $i_1 \in \{0, 1, \ldots, 7\}$ corresponds to the codebook index $\lfloor i_1/2 \rfloor$ in the Rank 1 source codebook, and the value of the second pre-coding matrix indicator information $i_2 \in \{0,1\}$ corresponds to the codebook index $2i_2+12$ in the Rank 1 source codebook; or, the value of the first pre-coding matrix indicator information $i_1 \in \{0, 1, \ldots, 7\}$ corresponds to the codebook index $2i_1$ in the Rank 1 source codebook, and the value of the second pre-coding matrix indicator information $i_2 \in \{0, 1\}$ corresponds to the codebook index $2i_2+12$ in the Rank 1 source codebook; or, the value of the first pre-coding matrix indicator information $i_1 \in \{0, 1, \ldots, 7\}$ corresponds to the codebook index $\lfloor i_1/2 \rfloor$ in the Rank 1 source codebook, when the value of the second pre-coding matrix indicator information is $i_2 \in \{0,1\}$, the value of the second pre-coding matrix indicator information corresponds to the codebook index $2i_2$ in the Rank 1 source codebook, and when the value of the second pre-coding matrix indicator information is $i_2 \in \{3,4\}$, the value of the second pre-coding matrix indicator information corresponds to the codebook index $2i_2+5$ in the Rank 1 source codebook; or, the value of the first pre-coding matrix indicator information $i_1 \in \{0, 1, \ldots, 7\}$ corresponds to the codebook index $2i_1$ in the Rank 1 source codebook, when the value of the second pre-coding matrix indicator information is $i_2 \in \{0, 1\}$, the value of the second pre-coding matrix indicator information corresponds to the codebook index $2i_2$ in the Rank 1 source codebook, and when the value of the second pre-coding matrix indicator information is $i_2 \in \{3, 4\}$, the value of the second pre-coding matrix indicator information corresponds to the codebook index $2i_2+5$ in the Rank 1 source codebook; or, the value of the first pre-coding matrix indicator information $i_1 \in \{0, 1, \ldots, 15\}$ corresponds to the codebook index $i_1$ in the Rank 1 source codebook, and the value of the second pre-coding matrix indicator information $i_2 \in \{0, 1\}$ corresponds to the codebook index $2i_2$ in the Rank 1 source codebook; or, the value of the first pre-coding matrix indicator information $i_1 \in \{0, 1, \ldots, 15\}$ corresponds to the codebook index $i_1$ in the Rank 1 source codebook, and the value of the second pre-coding matrix indicator information $i_2 \in \{0, 1\}$ corresponds to the codebook index $8+2i_2$ in the Rank 1 source codebook; or, the value of the first pre-coding matrix indicator information $i_1 \in \{0, 1, \ldots, 7\}$ corresponds to the codebook index $\lfloor i_1/2 \rfloor$ in the Rank 1 source codebook, when the value of the second pre-coding matrix indicator information is $i_2 \in \{0,1\}$ the value of the second pre-coding matrix indicator information corresponds to the codebook index $2i_2$ in the Rank 1 source codebook, and when the value of the second pre-coding matrix indicator information is $i_2 \in \{2,3\}$, the value of the second pre-coding matrix indicator information corresponds to the codebook index $8+2i_2$ in the Rank 1 source codebook; or, the value of the first pre-coding matrix indicator information $i_1 \in \{0, 1, \ldots, 7\}$ corresponds to the codebook index $2i_1$ in the Rank 1 source codebook, when the value of the second pre-coding matrix indicator information is $i_2 \in \{0, 1\}$, the value of the second pre-coding matrix indicator information corresponds to the codebook index $2i_2$ in the Rank 1 source codebook, and when the value of the second pre-coding matrix indicator information is $i_2 \in \{2, 3\}$, the value of the second pre-coding matrix indicator information corresponds to the codebook index $8+2i_2$ in the Rank 1 source codebook; or, the value of the first pre-coding matrix indicator information $i_1 \in \{0, 1, \ldots, 7\}$ corresponds to the codebook index $\lfloor i_1/2 \rfloor$ in the Rank 1 source codebook, and the value of the second pre-coding matrix indicator information $i_2 \in \{0,1\}$ corresponds to the codebook index $8i_2$ in the Rank 1 source codebook; or, the value of the first pre-coding matrix indicator information $i_1 \in \{0, 1, \ldots, 7\}$ corresponds to the codebook index $2i_1$ in the Rank 1 source codebook, and the value of the second pre-coding matrix indicator information $i_2 \in \{0, 1\}$ corresponds to the codebook index $8i_2$ in the Rank 1 source codebook; or, the value of the first pre-coding matrix indicator information $i_1 \in \{0, 1, \ldots, 15\}$ corresponds to the codebook index $i_1$ in the Rank 1 source codebook, and the value of the second pre-coding matrix indicator information $i_2=0$ corresponds to the codebook index $i_2=0$ in the Rank 1 source codebook;

therein, $\lfloor x \rfloor$ represents the greatest integer no greater than x.

11. The method of claim 9, wherein, when the RI value reported by the terminal equipment that base station receives is 2, the preset corresponding relationship of the first pre-coding matrix indicator information and the second pre-coding matrix indicator information with the two codebook indexes $i_1$ and $i_2$ in the source codebook, which is used by the base station to determine the pre-coding matrix, specifically comprises:

the value of the first pre-coding matrix indicator information $i_1 \in \{0, 1, \ldots, 7\}$ corresponds to the codebook index $\lfloor i_1/2 \rfloor$ in the Rank 2 source codebook, and the value of the second pre-coding matrix indicator information $i_2 \in \{0,1\}$ corresponds to the codebook index $i_2$ in the Rank 2 source codebook; or, the value of the first pre-coding matrix indicator information $i_1 \in \{0, 1, \ldots, 7\}$ corresponds to the codebook index $2i_1$ in the Rank 2 source codebook, and the value of the second pre-coding matrix indicator information $i_2 \in \{0, 1\}$ corresponds to the codebook index $i_2$ in the Rank 2 source codebook; or, the value of the first pre-coding matrix indicator information $i_1 \in \{0, 1, \ldots, 7\}$ corresponds to the codebook index $\lfloor i_1/2 \rfloor$ in the Rank 2 source codebook, and the value of the second pre-coding matrix indicator information $i_2 \in \{0,1\}$ corresponds to the codebook index $4+i_2$ in the Rank 2 source codebook; or, the value of the first pre-coding matrix indicator information $i_1 \in \{0, 1, \ldots, 7\}$ corresponds to the codebook index $2i_1$ in the Rank 2 source codebook, and the value of the second pre-coding matrix indicator information $i_2 \in \{0, 1\}$ corresponds to the codebook index $4+i_2$ in the Rank 2 source codebook; or, the value of the first pre-coding matrix indicator information $i_1 \in \{0, 1, \ldots, 7\}$ corresponds to the codebook index $\lfloor i_1/2 \rfloor$ in the Rank 2 source codebook, and the value of the second pre-coding matrix indicator information $i_2 \in \{0,1\}$ corresponds to the codebook index $4i_2$ in the Rank 2 source codebook; or, the value of the first pre-coding matrix indicator information $i_1 \in \{0, 1, \ldots, 7\}$ corresponds to the codebook index $2i_1$ in the Rank 2 source codebook, and the value of the second pre-coding matrix indicator information $i_2 \in \{0, 1\}$ corresponds to the codebook index $4i_2$ in the Rank 2 source codebook; or, the value of the first pre-coding matrix indicator information $i_1 \in \{0, 1, \ldots, 15\}$ corresponds to the codebook index $i_1$ in the Rank 2 source codebook, and the value of the second pre-coding matrix indicator information $i_2=0$ corresponds to the codebook index $i_2=0$ in the Rank 2 source codebook; or, the value of the first pre-coding matrix indicator information $i_1 \in \{0, 1, \ldots, 15\}$ corresponds to the codebook index $i_1$ in the Rank 2 source codebook, and the value of the second pre-coding matrix indicator information $i_2=0$ corresponds to the codebook index $i_2=4$ in the Rank 2 source codebook; or, the value of the first pre-coding matrix indicator information $i_1 \in \{0, 1, \ldots, 15\}$ corresponds to the codebook index $i_1$ in the Rank 2 source codebook, and the value of the second pre-coding matrix indicator information $i_2 \in \{0,1,2,3\}$ corresponds to the codebook index $2i_2$ in the Rank 2 source codebook; or, the value of the first pre-coding matrix indicator information $i_1 \in \{0, 1, \ldots, 7\}$ corresponds to the codebook index $\lfloor i_1/2 \rfloor$ in the Rank 2 source codebook, and the value of the second pre-coding matrix indicator information $i_2 \in \{0,1\}$ corresponds to the codebook index $5i_2$ in the Rank 2 source codebook; or, the value of the first pre-coding matrix indicator information $i_1 \in \{0, 1, \ldots, 7\}$ corresponds to the codebook index $2i_1$ in the Rank 2 source codebook, and the value of the second pre-coding matrix indicator information $i_2 \in \{0, 1\}$ corresponds to the codebook index $5i_2$ in the Rank 2 source codebook;

therein, $\lfloor x \rfloor$ represents the greatest integer no greater than x.

12. The method of claim 9, wherein, when the RI value reported by the terminal equipment that base station receives is 3, the preset corresponding relationship of the first pre-coding matrix indicator information and the second pre-coding matrix indicator information with the two codebook indexes $i_1$ and $i_2$ in the source codebook, which is used by the base station to determine the pre-coding matrix, specifically comprises:

the value of the first pre-coding matrix indicator information $i_1 \in \{0,1,2,3\}$ corresponds to the codebook index $i_1$ in the Rank 3 source codebook, and the value of the second pre-coding matrix indicator information $i_2 \in \{0,1,2,3\}$ corresponds to the codebook index $4i_2$ in the Rank 3 source codebook; or, the value of the first pre-coding matrix indicator information $i_1 \in \{0,1,2,3\}$ corresponds to the codebook index $i_1$ in the Rank 3 source codebook, and the value of the second pre-coding matrix indicator information $i_2 \in \{0,1,2,3\}$ corresponds to the codebook index $4i_2+1$ in the Rank 3 source codebook; or, the value of the first pre-coding matrix indicator information $i_1 \in \{0,1,2,3\}$ corresponds to the codebook index $i_1$ in the Rank 3 source codebook, and the value of the second pre-coding matrix indicator information $i_2 \in \{0,1,2,3\}$ corresponds to the codebook index $4i_2+2$ in the Rank 3 source codebook; or, the value of the first pre-coding matrix indicator information $i_1 \in \{0,1,2,3\}$ corresponds to the codebook index $i_1$ in the Rank 3 source codebook, and the value of the second pre-coding matrix indicator information $i_2 \in \{0,1,2,3\}$ corresponds to the codebook index $4i_2+3$ in the Rank 3 source codebook; or, the value of the first pre-coding matrix indicator information $i_1 \in \{0,1\}$ corresponds to the codebook index $\lfloor i_1/2 \rfloor$ in the Rank 3 source codebook, and the value of the second pre-coding matrix indicator information $i_2 \in \{0, 1, \ldots, 7\}$ corresponds to the codebook index $4 \cdot \lfloor i_2/2 \rfloor + (i_2 \bmod 2)$ in the Rank 3 source codebook; or, the value of the first pre-coding matrix indicator information $i_1 \in \{0,1\}$ corresponds to the codebook index $2i_1$ in the Rank 3 source codebook, and the value of the second pre-coding matrix indicator information $i_2 \in \{0, 1, \ldots, 7\}$ corresponds to the codebook index $4 \cdot \lfloor i_2/2 \rfloor + (i_2 \bmod 2)$ in the Rank 3 source codebook; or, the value of the first pre-coding matrix indicator information $i_1 \in \{0,1\}$ corresponds to the codebook index $\lfloor i_1/2 \rfloor$ in the Rank 3 source codebook, and the value of the second pre-coding matrix indicator information $i_2 \in \{0, 1, \ldots, 7\}$ corresponds to the codebook index $2i_2$ in the Rank 3 source codebook; or, the value of the first pre-coding matrix indicator information $i_1 \in \{0,1\}$ corresponds to the codebook index $2i_1$ in the Rank 3 source codebook, and the value of the second pre-coding matrix indicator information $i_2 \in \{0, 1, \ldots, 7\}$ corresponds to the codebook index $2i_2$ in the Rank 3 source codebook; or, the value of the first pre-coding matrix indicator information $i_1 \in \{0,1\}$ corresponds to the codebook index $\lfloor i_1/2 \rfloor$ in the Rank 3 source codebook, and the value of the second pre-coding matrix indicator information $i_2 \in \{0, 1, \ldots, 7\}$ corresponds to the codebook index $4 \cdot \lfloor i_2/2 \rfloor + 3 \cdot (i_2 \bmod 2)$ in the Rank 3 source codebook; or, the value of the first pre-coding matrix indicator information $i_1 \in \{0,1\}$ corresponds to the codebook index $2i_1$ in the Rank 3 source codebook, and the value of the second pre-coding matrix indicator information $i_2 \in \{0, 1, \ldots, 7\}$ corresponds to the codebook index $4 \cdot \lfloor i_2/2 \rfloor + 3 \cdot (i_2 \bmod 2)$ in the Rank 3 source codebook; or, the value of the first pre-coding matrix indicator information $i_1 \in \{0,1\}$ corresponds to the codebook index $\lfloor i_1/2 \rfloor$ in the Rank 3 source codebook, and the value of the second pre-coding matrix indicator information $i_2 \in \{0, 1, \ldots, 7\}$ corresponds to the codebook index $2i_2+1$ in the Rank 3 source codebook; or, the value of the first pre-coding matrix indicator information $i_1 \in \{0,1\}$ corresponds to the codebook index $2i_1$ in the Rank 3 source codebook, and the value of the second pre-coding matrix indicator information $i_2 \in \{0, 1, \ldots, 7\}$ corresponds to the codebook index $2i_2+1$ in the Rank 3 source codebook; or, the value of the first pre-coding matrix indicator information $i_1 \in \{0,1\}$ corresponds to the codebook index $\lfloor i_1/2 \rfloor$ in the Rank 3 source codebook, and the value of the second pre-coding matrix indicator information $i_2 \in \{0, 1, \ldots, 7\}$ corresponds to the codebook index $8 \lfloor i_2/4 \rfloor + i_2$ in the Rank 3 source codebook; or, the value of the first pre-coding matrix indicator information $i_1 \in \{0,1\}$ corresponds to the codebook index $2i_1$ in the Rank 3 source codebook, and the value of the second pre-coding matrix indicator information $i_2 \in \{0, 1, \ldots, 7\}$ corresponds to the codebook index $4 \lfloor i_2/4 \rfloor + i_2$ in the Rank 3 source codebook; or, the value of the first pre-coding matrix indicator information $i_1 \in \{0,1,2,3\}$ corresponds to the codebook index $i_1$ in the Rank 3 source codebook, and the value of the second pre-coding matrix indicator information $i_2 \in \{0,1,2,3\}$ corresponds to the codebook index $i_2$ in the Rank 3 source codebook; or, the value of the first pre-coding matrix indicator information $i_1 \in \{0,1,2,3\}$ corresponds to the codebook index $i_1$ in the Rank 3 source codebook, and the value of the second pre-coding matrix indicator information $i_2 \in \{0,1,2,3\}$ corresponds to the codebook index $i_2+4$ in the Rank 3 source codebook; or, the value of the first pre-coding matrix indicator information $i_1 \in \{0,1,2,3\}$ corresponds to the codebook index $i_1$ in the Rank 3 source codebook, and the value of the second pre-coding matrix indicator information $i_2 \in \{0,1,2,3\}$ corresponds to the codebook index $i_2+8$ in the Rank 3 source codebook; or, the value of the first pre-coding matrix indicator information $i_1 \in \{0,1,2,3\}$ corresponds to the codebook index $i_1$ in the Rank 3 source codebook, and the value of the second pre-coding matrix indicator information $i_2 \in \{0,1,2,3\}$ corresponds to the codebook index $i_{2+12}$ in the Rank 3 source codebook; or, the value of the first pre-coding matrix indicator information $i_1 \in \{0,1,2,3\}$ corresponds to the codebook index $i_1$ in the Rank 3 source codebook, and the value of the second pre-coding matrix indicator information $i_2 \in \{0,1,2,3\}$ corresponds to the codebook index $8 \cdot \lfloor i_2/2 \rfloor + (i_2 \bmod 2)$ in the Rank 3 source codebook; or, the value of the first pre-coding matrix indicator information $i_1 \in \{0,1,2,3\}$ corresponds to the codebook index $i_1$ in the Rank 3 source codebook, and the value of the second pre-coding matrix indicator information $i_2 \in \{0,1,2,3\}$ corresponds to the codebook index $8 \cdot \lfloor i_2/2 \rfloor + (i_2 \bmod 2) + 2$ in the Rank 3 source codebook;

therein, $\lfloor x \rfloor$ represents the greatest integer no greater than x and i mod 2 represents the remainder of dividing i by 2.

13. The method of claim 9, wherein, when the RI value reported by the terminal equipment that base station receives is 4, the preset corresponding relationship of the first pre-coding matrix indicator information and the second pre-coding matrix indicator information with the two codebook indexes $i_1$ and $i_2$ in the source codebook, which is used by the base station to determine the pre-coding matrix, specifically comprises:

the value of the first pre-coding matrix indicator information $i_1 \in \{0,1,2,3\}$ corresponds to the codebook index $i_1$ in the Rank 4 source codebook, and the value of the second pre-coding matrix indicator information $i_2 \in \{0,1,2,3\}$ corresponds to the codebook index $2i_2$ in the Rank 4 source codebook; or, the value of the first pre-coding matrix indicator information $i_1 \in \{0,1,2,3\}$ corresponds to the codebook index $i_1$ in the Rank 4 source codebook, and the value of the second pre-coding matrix indicator information $i_2 \in \{0,1,2,3\}$ corresponds to the codebook index $4 \cdot \lfloor i_2/2 \rfloor + 3(i_2 \bmod 2)$ in the Rank 4 source codebook; or, the value of the first pre-coding matrix indicator information $i_1 \in \{0, 1,2,3\}$ corresponds to the codebook index $i_1$ in the Rank 4 source codebook, and the value of the second pre-coding matrix indicator information $i_2 \in \{0,1,2,3\}$ corresponds to the codebook index $2+i_2$ in the Rank 4 source codebook; or, the value of the first pre-coding matrix indicator information $i_1 \in \{0,1\}$ corresponds to the codebook index $\lfloor i_1/2 \rfloor$ in the Rank 4 source codebook, and the value of the second pre-coding matrix indicator information $i_2 \in \{0, 1, \ldots, 7\}$ corresponds to the codebook index $i_2$ in the Rank 4 source codebook; or, the value of the first pre-coding matrix indicator information $i_1 \in \{0,1\}$ corresponds to the codebook index $2i_1$ in the Rank 4 source codebook, and the value of the second pre-coding matrix indicator information $i_2 \in \{0, 1, \ldots, 7\}$ corresponds to the codebook index $i_2$ in the Rank 4 source codebook;

therein, $\lfloor x \rfloor$ represents the greatest integer no greater than x and i mod 2 represents the remainder of dividing i by 2.

14. The method of claim 9, wherein, when the RI value reported by the terminal equipment that base station receives is 1, the preset corresponding relationship of the pre-coding matrix indicator information with the codebook index pair $(i_1, i_2)$ composed of the two codebook indexes in the source codebook, which is used by the base station to determine the pre-coding matrix, specifically comprises:

the value of the pre-coding matrix indicator information $i \in \{0, 1, \ldots, 15\}$ corresponds to the codebook index pair $(i_1, i_2)$ in the Rank 1 source codebook, therein, $i_1 = i$ and $i_2 = 2 \cdot (i \bmod 2)$; or, the value of the pre-coding matrix indicator information $i \in \{0, 1, \ldots, 15\}$ corresponds to the codebook index pair $(i_1, i_2)$ in the Rank 1 source codebook, therein, $i_1 = i$ and $i_2 = 8 + 2 \cdot (i \bmod 2)$; or, the value of the pre-coding matrix indicator information $i \in \{0, 1, \ldots, 15\}$ corresponds to the codebook index pair $(i_1, i_2)$ in the Rank 1 source codebook, therein, $i_1 = i$ and $i_2 = i \bmod 4$; or, the value of the pre-coding matrix indicator information $i \in \{0, 1, \ldots, 15\}$ corresponds to the codebook index pair $(i_1, i_2)$ in the Rank 1 source codebook, therein, $i_1 = i$ and $i_2 = 8 + 2 \cdot (i \bmod 4)$;

therein, i mod 2 represents the remainder of dividing i by 2 and i mod 4 represents the remainder of dividing i by 4.

15. The method of claim 9, wherein, the source codebook, specifically refers to:

codebook for 8 antenna ports in LTE-A system.

16. A base station, wherein, comprising:

a setting module, used to set a corresponding relationship of the pre-coding matrix indicator information with the codebook index in the source codebook;

a sending module, used to send control signaling to terminal equipment to inform the terminal equipment that channel state information feedback is needed and feedback mode to be used by the channel state information feedback;

a receiving module, used to receive RI and pre-coding matrix indicator information that terminal equipment reports as per the feedback mode that the sending module informs;

a determination module, used to determine a pre-coding matrix according to corresponding relationship of pre-coding matrix indicator information with the codebook index in the source codebook that setting module sets according to the RI value and the value of pre-coding matrix indicator information that the receiving module receives;

therein, the determination module, specifically used to:

determine a pre-coding matrix according to the RI value and the corresponding relationship of the first pre-coding matrix indicator information and the second pre-coding matrix indicator information with the two codebook indexes $i_1$ and $i_2$ in the source codebook set by the setting module when the pre-coding matrix indicator information reported by the terminal equipment that receiving module receives specifically comprises the first pre-coding matrix indicator information and the second pre-coding matrix indicator information; or, determine a pre-coding matrix according to the RI value and the corresponding relationship of the pre-coding matrix indicator information with the codebook index pair ($i_1$, $i_2$) composed of the two codebook indexes in the source codebook set by the setting module when the pre-coding matrix indicator information reported by the terminal equipment that receiving module receives specifically refers to a piece of pre-coding matrix indicator information; or, determine a pre-coding matrix according to the RI value and the corresponding relationship of the pre-coding matrix indicator information pair composed of the first pre-coding matrix indicator information and the second pre-coding matrix indicator information with the codebook index pair ($i_1$, $i_2$) composed of the two codebook indexes in the source codebook set by the setting module when the pre-coding matrix indicator information reported by the terminal equipment that receiving module receives specifically comprises a pre-coding matrix indicator information pair composed of the first pre-coding matrix indicator information and the second pre-coding matrix indicator information; or, determine a pre-coding matrix according to the RI value and the corresponding relationship of the pre-coding matrix indicator information with the two codebook indexes $i_1$ and $i_2$ in the source codebook set by the setting module when the pre-coding matrix indicator information reported by the terminal equipment that receiving module receives specifically refers to a pre-coding matrix.

* * * * *